US00RE47443E

(19) United States
(12) Reissued Patent
Vainstein

(10) Patent Number: US RE47,443 E
(45) Date of Reissued Patent: Jun. 18, 2019

(54) DOCUMENT SECURITY SYSTEM THAT PERMITS EXTERNAL USERS TO GAIN ACCESS TO SECURED FILES

(71) Applicant: Intellectual Ventures I LLC, Wilmington, DE (US)

(72) Inventor: Klimenty Vainstein, Cupertino, CA (US)

(73) Assignee: Intellectual Ventures I LLC, Wilmington, DE (US)

(21) Appl. No.: 15/418,263

(22) Filed: Jan. 27, 2017

Related U.S. Patent Documents

Reissue of:
(64) Patent No.: 8,943,316
Issued: Jan. 27, 2015
Appl. No.: 13/439,485
Filed: Apr. 4, 2012

U.S. Applications:
(62) Division of application No. 10/262,218, filed on Sep. 30, 2002, now Pat. No. 8,176,334.

(51) Int. Cl.
*G06F 21/00* (2013.01)
*H04L 29/00* (2006.01)
(Continued)

(52) U.S. Cl.
CPC ..... *G06F 21/6209* (2013.01); *G06F 21/6218* (2013.01)

(58) Field of Classification Search
CPC ..... G06F 21/10; G06F 21/31; G06F 21/572; G06F 21/604; G06F 21/606; G06F 21/6209; G06F 21/6218; G06F 21/6245; G06F 9/46; H04L 63/0815; H04L 63/0428; H04L 41/0213; G06Q 30/02
USPC ..... 705/51, 37; 707/999.009; 709/223, 217; 713/150, 193; 726/21; 380/277, 278, 380/286
See application file for complete search history.

(56) References Cited

U.S. PATENT DOCUMENTS 4,203,166 A 5/1980 Ehrsam et al.
4,238,854 A 12/1980 Ehrsam et al.
(Continued)

FOREIGN PATENT DOCUMENTS

EP 0 672 991 A2 9/1995
EP 0 674 253 A1 9/1995
(Continued)

OTHER PUBLICATIONS

Adobe Acrobat 5.0 Classroom in a Book, Adobe Press, Jun. 26, 2001, pp. 1-4.
(Continued)

*Primary Examiner* — Christopher E. Lee
(74) *Attorney, Agent, or Firm* — Sterne, Kessler, Goldstein & Fox P.L.L.C.

(57) ABSTRACT

A system includes a server with an access manager configured to restrict access to files of an organization and maintain at least encryption keys for internal and external users and an external access server connected to the server and coupled between the server and a data network. The data network is configured to allow the external users use of the external access server. The external access server is also configured to permit file exchange between the internal users and the external users via the server.

27 Claims, 9 Drawing Sheets

(51) Int. Cl.

| | |
|---|---|
| ***H04L 29/06*** | (2006.01) |
| ***H04N 7/16*** | (2011.01) |
| ***G06F 15/16*** | (2006.01) |
| ***G06F 17/30*** | (2006.01) |
| ***G06F 7/04*** | (2006.01) |
| ***G06F 21/62*** | (2013.01) |

(56) References Cited

U.S. PATENT DOCUMENTS 4,423,387 A 12/1983 Sempel
4,734,568 A 3/1988 Watanabe
4,757,533 A 7/1988 Allen et al.
4,796,220 A 1/1989 Wolfe
4,799,258 A 1/1989 Davies
4,827,508 A 5/1989 Shear
4,887,204 A 12/1989 Johnson et al.
4,888,800 A 12/1989 Marshall et al.
4,912,552 A 3/1990 Allison, III et al.
4,972,472 A 11/1990 Brown et al.
5,032,979 A 7/1991 Hecht et al.
5,052,040 A 9/1991 Preston et al.
5,058,164 A 10/1991 Elmer et al.
5,144,660 A 9/1992 Rose
5,204,897 A 4/1993 Wyman
5,212,788 A 5/1993 Lomet et al.
5,220,657 A 6/1993 Bly et al.
5,235,641 A 8/1993 Nozawa et al.
5,247,575 A 9/1993 Sprague et al.
5,267,313 A 11/1993 Hirata
5,276,735 A 1/1994 Boebert et al.
5,301,247 A 4/1994 Rasmussen et al.
5,319,705 A 6/1994 Halter et al.
5,357,375 A 10/1994 Harig et al.
5,369,702 A 11/1994 Shanton
5,375,169 A 12/1994 Seheidt et al.
5,404,404 A 4/1995 Novorita
5,406,628 A 4/1995 Beller et al.
5,414,852 A 5/1995 Kramer et al.
5,434,918 A 7/1995 Kung et al.
5,461,710 A 10/1995 Bloomfield et al.
5,467,342 A 11/1995 Logston et al.
5,495,533 A 2/1996 Linehan et al. ..... G06F 21/31 380/277
5,497,422 A 3/1996 Tysen et al.
5,499,297 A 3/1996 Boebert
5,502,766 A 3/1996 Boebert et al.
5,535,375 A 7/1996 Eshel et al.
5,557,765 A 9/1996 Lipner et al.
5,570,108 A 10/1996 McLaughlin et al.
5,584,023 A 12/1996 Hsu
5,600,722 A 2/1997 Yamaguchi et al.
5,606,663 A 2/1997 Kadooka
5,619,576 A 4/1997 Shaw
5,638,501 A 6/1997 Gough et al.
5,655,119 A 8/1997 Davy
5,661,668 A 8/1997 Yemini et al.
5,661,806 A 8/1997 Nevoux et al.
5,671,412 A 9/1997 Christiano
5,673,316 A 9/1997 Auerbach et al.
5,677,953 A 10/1997 Dolphin
5,680,452 A 10/1997 Shanton
5,682,537 A 10/1997 Davies et al.
5,684,987 A 11/1997 Mamiya et al.
5,689,688 A 11/1997 Strong et al.
5,689,718 A 11/1997 Sakurai et al.
5,693,652 A 12/1997 Takase et al.
5,699,428 A 12/1997 McDonnal et al.
5,708,709 A 1/1998 Rose
5,715,403 A 2/1998 Stefik
5,717,755 A 2/1998 Shanton
5,719,941 A 2/1998 Swift et al.
5,720,033 A 2/1998 Deo
5,721,780 A 2/1998 Ensor et al.
5,729,734 A 3/1998 Parker et al.
5,732,265 A 3/1998 Dewitt et al.
5,745,573 A 4/1998 Lipner et al.
5,745,750 A 4/1998 Porcaro
5,748,736 A 5/1998 Mittra
5,751,287 A 5/1998 Hahn et al.
5,757,920 A 5/1998 Misra et al.
5,765,152 A 6/1998 Erickson
5,768,381 A 6/1998 Hawthorne
5,778,065 A 7/1998 Hauser et al.
5,778,350 A 7/1998 Adams et al.
5,781,711 A 7/1998 Austin et al.
5,787,169 A 7/1998 Eldridge et al.
5,787,173 A 7/1998 Seheidt et al.
5,787,175 A * 7/1998 Carter ..... 713/165
5,790,789 A 8/1998 Suarez
5,790,790 A 8/1998 Smith et al.
5,813,009 A 9/1998 Johnson et al.
5,821,933 A 10/1998 Keller et al.
5,825,876 A 10/1998 Peterson, Jr.
5,835,592 A 11/1998 Chang et al.
5,835,601 A 11/1998 Shimbo et al.
5,850,443 A 12/1998 Van Oorschot et al.
5,857,189 A 1/1999 Riddle
5,862,325 A 1/1999 Reed et al.
5,864,683 A * 1/1999 Boebert et al. ..... 709/249
5,870,468 A 2/1999 Harrison
5,870,477 A 2/1999 Sasaki et al.
5,881,287 A 3/1999 Mast
5,892,900 A 4/1999 Ginter et al.
5,893,084 A 4/1999 Morgan et al.
5,898,781 A 4/1999 Shanton
5,922,073 A 7/1999 Shimada
5,923,754 A 7/1999 Angelo et al.
5,933,498 A 8/1999 Schneck et al.
5,940,507 A * 8/1999 Cane ..... G06F 21/6245 380/277
5,944,794 A 8/1999 Okamoto et al.
5,953,419 A 9/1999 Lohstroh et al.
5,968,177 A 10/1999 Batten-Carew et al. ..... G06F 21/604 380/286
5,970,502 A 10/1999 Salkewicz et al.
5,978,802 A 11/1999 Hurvig
5,987,440 A 11/1999 O'Neil et al.
5,991,879 A 11/1999 Still
5,999,907 A 12/1999 Donner
6,011,847 A 1/2000 Follendore, III
6,014,730 A 1/2000 Ohtsu
6,023,506 A 2/2000 Ote et al.
6,031,584 A 2/2000 Gray
6,032,216 A 2/2000 Schmuck et al.
6,035,404 A 3/2000 Zhao
6,038,322 A 3/2000 Harkins
6,044,155 A 3/2000 Thomlinson et al.
6,055,314 A 4/2000 Spies et al.
6,058,424 A 5/2000 Dixon et al.
6,061,790 A 5/2000 Bodnar
6,069,057 A 5/2000 Wu
6,069,957 A 5/2000 Richards
6,070,244 A 5/2000 Orchier et al.
6,073,242 A * 6/2000 Hardy et al. ..... 726/1
6,085,323 A 7/2000 Shimizu et al.
6,088,717 A * 7/2000 Reed et al. ..... 709/201
6,088,805 A 7/2000 Davis et al.
6,098,056 A 8/2000 Rusnak et al.
6,101,507 A 8/2000 Cane et al.
6,105,131 A 8/2000 Carroll
6,122,630 A 9/2000 Strickler et al.
6,134,327 A 10/2000 Van Oorschot
6,134,658 A 10/2000 Multerer et al.
6,134,660 A 10/2000 Boneh et al.
6,134,664 A 10/2000 Walker
6,141,754 A 10/2000 Choy
6,145,084 A 11/2000 Zuili et al.
6,148,338 A 11/2000 Lachelt et al.
6,158,010 A 12/2000 Moriconi et al.
6,161,139 A 12/2000 Win et al.
6,182,142 B1 1/2001 Win et al.
6,185,684 B1 2/2001 Pravetz et al.
6,192,408 B1 2/2001 Vahalia et al.

(56) References Cited

U.S. PATENT DOCUMENTS 6,199,070 B1 3/2001 Polo-Wood et al.
6,205,549 B1 3/2001 Pravetz
6,212,561 B1 4/2001 Sitaraman et al.
6,223,285 B1 4/2001 Komuro et al.
6,226,618 B1 5/2001 Downs et al.
6,226,745 B1 * 5/2001 Wiederhold ..... 726/1
6,240,188 B1 5/2001 Dondeti et al.
6,249,755 B1 6/2001 Yemini et al.
6,249,873 B1 6/2001 Richard et al.
6,253,193 B1 6/2001 Ginter et al.
6,260,040 B1 7/2001 Kauffman et al.
6,260,141 B1 7/2001 Park
6,263,348 B1 7/2001 Kathrow et al.
6,266,420 B1 7/2001 Langford et al.
6,272,631 B1 8/2001 Thomlinson et al.
6,272,632 B1 8/2001 Carman et al.
6,275,941 B1 * 8/2001 Saito et al. ..... 726/2
6,282,649 B1 8/2001 Lambert et al.
6,289,450 B1 9/2001 Pensak et al.
6,289,458 B1 9/2001 Garg et al.
6,292,895 B1 9/2001 Baltzley
6,292,899 B1 9/2001 McBride
6,295,361 B1 9/2001 Kadansky et al.
6,298,445 B1 * 10/2001 Shostack et al. ..... 726/25
6,299,069 B1 10/2001 Shona
6,301,614 B1 10/2001 Najork et al.
6,308,256 B1 10/2001 Folmsbee
6,308,273 B1 10/2001 Goertzel et al.
6,314,408 B1 11/2001 Salas et al.
6,314,409 B2 11/2001 Schneck et al.
6,317,777 B1 11/2001 Skarbo et al.
6,332,025 B2 12/2001 Takahashi et al.
6,334,146 B1 * 12/2001 Parasnis ..... G06F 9/46
709/217
6,336,114 B1 1/2002 Garrison
6,339,423 B1 1/2002 Sampson et al.
6,339,825 B2 1/2002 Pensak et al.
6,341,164 B1 1/2002 Dilkie et al.
6,343,316 B1 1/2002 Sakata
6,347,374 B1 2/2002 Drake et al.
6,349,337 B1 2/2002 Parsons, Jr. et al.
6,351,813 B1 2/2002 Mooney et al.
6,356,903 B1 3/2002 Baxter et al.
6,356,941 B1 3/2002 Cohen
6,357,010 B1 3/2002 Viets et al.
6,363,480 B1 3/2002 Perlman
6,366,298 B1 4/2002 Haitsuka et al.
6,370,249 B1 4/2002 Van Oorschot
6,381,698 B1 4/2002 Devanbu et al.
6,385,644 B1 5/2002 Devine et al.
6,389,433 B1 5/2002 Bolosky et al.
6,389,538 B1 5/2002 Gruse et al.
6,393,420 B1 5/2002 Peters
6,405,315 B1 6/2002 Burns et al.
6,405,318 B1 6/2002 Rowland
6,408,404 B1 6/2002 Ladwig
6,421,714 B1 7/2002 Rai et al.
6,442,688 B1 8/2002 Moses et al.
6,442,695 B1 8/2002 Dutcher et al.
6,446,090 B1 9/2002 Hart
6,449,721 B1 9/2002 Pensak et al.
6,453,353 B1 9/2002 Win et al.
6,453,419 B1 9/2002 Flint et al.
6,466,476 B1 10/2002 Wong et al.
6,466,932 B1 10/2002 Dennis et al.
6,476,833 B1 11/2002 Moshfeghi
6,477,544 B1 11/2002 Bolosky et al.
6,487,662 B1 11/2002 Kharon et al.
6,490,680 B1 12/2002 Scheidt et al.
6,505,300 B2 1/2003 Chan et al.
6,510,349 B1 1/2003 Schneck et al.
6,519,700 B1 2/2003 Ram et al.
6,529,956 B1 3/2003 Smith et al.
6,530,020 B1 * 3/2003 Aoki ..... 713/163
6,530,024 B1 3/2003 Proctor
6,542,608 B2 4/2003 Scheidt et al.
6,549,623 B1 4/2003 Scheidt et al.
6,550,011 B1 4/2003 Sims, III
6,557,039 B1 4/2003 Leong et al.
6,567,914 B1 5/2003 Just et al.
6,571,291 B1 5/2003 Chow
6,574,733 B1 6/2003 Langford
6,584,466 B1 6/2003 Serbinis et al.
6,587,878 B1 7/2003 Merriam
6,587,946 B1 7/2003 Jakobsson
6,588,673 B1 7/2003 Chan et al.
6,591,295 B1 7/2003 Diamond et al.
6,594,662 B1 7/2003 Sieffert et al.
6,598,161 B1 7/2003 Kluttz et al.
6,601,170 B1 7/2003 Wallace, Jr.
6,603,857 B1 8/2003 Batten-Carew et al.
6,608,636 B1 8/2003 Roseman
6,609,115 B1 8/2003 Mehring et al.
6,611,599 B2 8/2003 Natarajan
6,611,846 B1 8/2003 Stoodley
6,615,349 B1 9/2003 Hair
6,615,350 B1 9/2003 Schell et al.
6,625,650 B2 9/2003 Stelliga
6,625,734 B1 9/2003 Marvit et al.
6,629,140 B1 9/2003 Fertell et al.
6,629,243 B1 9/2003 Kleinman et al.
6,633,311 B1 10/2003 Douvikas et al.
6,640,307 B2 10/2003 Viets et al.
6,646,515 B2 11/2003 Jun et al.
6,647,388 B2 11/2003 Numao et al.
6,678,835 B1 1/2004 Shah et al.
6,683,954 B1 1/2004 Searle
6,687,822 B1 2/2004 Jakobsson
6,693,652 B1 2/2004 Barrus et al.
6,698,022 B1 2/2004 Wu
6,711,683 B1 3/2004 Laczko, Sr. et al.
6,718,361 B1 4/2004 Basani et al.
6,735,701 B1 5/2004 Jacobson
6,738,908 B1 5/2004 Bonn et al.
6,751,573 B1 6/2004 Burch
6,754,657 B2 6/2004 Lomet
6,754,665 B1 6/2004 Kawamoto et al.
6,775,779 B1 8/2004 England et al.
6,779,031 B1 8/2004 Picher-Dempsey
6,782,403 B1 8/2004 Kino et al.
6,785,810 B1 * 8/2004 Lirov et al. ..... G06F 21/606
707/999.009
6,801,999 B1 10/2004 Venkatesan et al.
6,807,534 B1 10/2004 Erickson
6,807,636 B2 10/2004 Hartman et al.
6,810,389 B1 10/2004 Meyer
6,810,479 B1 10/2004 Barlow et al.
6,816,871 B2 11/2004 Lee
6,816,969 B2 11/2004 Miyazaki et al.
6,820,204 B1 * 11/2004 Desai et al. ..... 726/6
6,826,698 B1 11/2004 Minkin et al.
6,834,333 B2 12/2004 Yoshino et al.
6,834,341 B1 12/2004 Bahl et al.
6,834,351 B1 * 12/2004 Kabenjian ..... G06F 21/572
707/999.009
6,842,825 B2 1/2005 Geiner et al.
6,845,452 B1 * 1/2005 Roddy et al. ..... 726/11
6,851,050 B2 2/2005 Singhal et al.
6,862,103 B1 3/2005 Miura et al.
6,865,555 B2 3/2005 Novak
6,870,920 B2 3/2005 Henits
6,874,139 B2 3/2005 Krueger et al.
6,877,010 B2 4/2005 Smith-Semedo et al.
6,877,136 B2 4/2005 Bess et al.
6,882,994 B2 4/2005 Yoshimura et al.
6,889,210 B1 5/2005 Vainstein
6,891,953 B1 5/2005 DeMello et al.
6,892,201 B2 5/2005 Brown et al.
6,892,306 B1 5/2005 En-Seung et al.
6,898,627 B1 5/2005 Sekiguchi
6,907,034 B1 6/2005 Begis
6,909,708 B1 6/2005 Krishnaswamy et al.
6,915,425 B2 7/2005 Xu et al.
6,915,434 B1 7/2005 Kuroda et al.

(56) References Cited

U.S. PATENT DOCUMENTS 6,915,435 B1 7/2005 Merriam
6,920,558 B2 7/2005 Sames et al.
6,922,785 B1 7/2005 Brewer et al.
6,924,425 B2 8/2005 Naples et al.
6,931,450 B2 8/2005 Howard et al.
6,931,530 B2 8/2005 Pham et al.
6,931,597 B1 8/2005 Prakash
6,938,042 B2 8/2005 Aboulhosn et al.
6,938,156 B2 8/2005 Wheeler et al.
6,941,355 B1 9/2005 Donaghey et al.
6,941,456 B2 9/2005 Wilson
6,941,472 B2 9/2005 Moriconi et al.
6,944,183 B1 9/2005 Iyer et al.
6,947,556 B1 9/2005 Matyas, Jr. et al.
6,950,818 B2 9/2005 Dennis et al.
6,950,936 B2 9/2005 Subramaniam et al.
6,950,941 B1 9/2005 Lee et al.
6,950,943 B1 9/2005 Bacha et al.
6,952,780 B2 10/2005 Olsen et al.
6,957,261 B2 10/2005 Lortz
6,959,308 B2 10/2005 Gramsamer et al.
6,961,849 B1 11/2005 Davis et al.
6,961,855 B1 11/2005 Rich et al.
6,968,060 B1 11/2005 Pinkas
6,968,456 B1 11/2005 Tripathi et al.
6,971,018 B1 11/2005 Witt et al.
6,976,259 B1 12/2005 Dutta et al.
6,978,366 B1 12/2005 Ignatchenko et al.
6,978,376 B2 12/2005 Giroux et al.
6,978,377 B1 12/2005 Asano et al.
6,987,752 B1 1/2006 Sarraf et al.
6,988,133 B1 1/2006 Zavalkovsky et al.
6,988,199 B2 1/2006 Toh et al.
6,990,441 B1 1/2006 Bolme et al.
6,993,135 B2 1/2006 Ishibashi
6,996,718 B1 2/2006 Henry et al.
7,000,150 B1 2/2006 Zunino et al.
7,003,116 B2 2/2006 Riedel et al.
7,003,117 B2 2/2006 Kacker et al.
7,003,560 B1 2/2006 Mullen et al.
7,003,661 B2 2/2006 Beattie et al.
7,010,689 B1 * 3/2006 Matyas, Jr. et al. ..... 713/168
7,010,809 B2 3/2006 Hori et al.
7,013,332 B2 3/2006 Friedel et al.
7,013,485 B2 3/2006 Brown et al.
7,020,645 B2 3/2006 Bisbee et al.
7,024,427 B2 4/2006 Bobbitt et al.
7,035,854 B2 4/2006 Hsiao et al.
7,035,910 B1 4/2006 Dutta et al.
7,043,637 B2 5/2006 Bolosky et al.
7,046,807 B2 5/2006 Hirano et al.
7,047,404 B1 5/2006 Doonan et al.
7,051,213 B1 5/2006 Kobayashi et al.
7,058,696 B1 6/2006 Phillips et al.
7,058,802 B1 * 6/2006 Epstein et al. ..... 713/150
7,058,978 B2 6/2006 Feuerstein et al.
7,062,642 B1 6/2006 Langrind et al.
7,073,063 B2 7/2006 Peinado
7,073,073 B1 7/2006 Nonaka et al.
7,076,063 B2 7/2006 Kuroiwa
7,076,067 B2 7/2006 Raike et al.
7,076,312 B2 7/2006 Law et al.
7,076,469 B2 7/2006 Schreiber et al.
7,076,633 B2 7/2006 Tormasov et al.
7,080,077 B2 7/2006 Ramamurthy et al.
7,095,853 B2 8/2006 Morishita
7,096,266 B2 8/2006 Lewin et al.
7,099,926 B1 8/2006 Ims et al.
7,103,911 B2 9/2006 Spies et al.
7,107,185 B1 9/2006 Yemini et al.
7,107,269 B2 9/2006 Arlein et al.
7,107,416 B2 9/2006 Stuart et al.
7,113,594 B2 9/2006 Boneh et al.
7,116,785 B2 10/2006 Okaue
7,117,322 B2 10/2006 Hochberg et al.
7,120,635 B2 10/2006 Bhide et al.
7,120,757 B2 10/2006 Tsuge
7,120,935 B2 10/2006 Serani et al.
7,124,164 B1 10/2006 Chemtob
7,126,957 B1 10/2006 Isukapalli et al.
7,130,964 B2 10/2006 Ims et al.
7,131,071 B2 10/2006 Gune et al.
7,134,041 B2 11/2006 Murray et al.
7,136,903 B1 11/2006 Phillips et al.
7,139,399 B1 11/2006 Zimmermann
7,140,044 B2 11/2006 Redlich et al.
7,145,898 B1 12/2006 Elliott
7,146,388 B2 12/2006 Stakutis et al.
7,146,498 B1 12/2006 Takechi et al.
7,149,896 B1 * 12/2006 Bahl et al. ..... 713/166
7,159,036 B2 1/2007 Hinchliffe et al.
7,165,179 B2 1/2007 Maruyama et al.
7,168,094 B1 1/2007 Fredell
7,171,557 B2 1/2007 Kallahalla et al.
7,174,563 B1 2/2007 Brownlie et al.
7,177,426 B1 2/2007 Dube
7,177,427 B1 2/2007 Komuro et al.
7,177,839 B1 2/2007 Claxton et al.
7,178,033 B1 * 2/2007 Garcia ..... 713/184
7,181,017 B1 2/2007 Nagel et al.
7,185,192 B1 * 2/2007 Kahn ..... 713/155
7,185,196 B1 2/2007 Kuskin et al.
7,185,199 B2 * 2/2007 Balfanz et al. ..... 713/168
7,185,364 B2 * 2/2007 Knouse et al. ..... 726/8
7,187,033 B2 3/2007 Pendharkar
7,188,181 B1 3/2007 Squier et al.
7,194,764 B2 3/2007 Martherus et al.
7,197,638 B1 3/2007 Grawrock et al.
7,200,747 B2 4/2007 Riedel et al.
7,203,317 B2 4/2007 Kallahalla et al.
7,203,968 B2 4/2007 Asano et al.
7,216,368 B2 * 5/2007 Ishiguro ..... 726/32
7,219,230 B2 5/2007 Riedel et al.
7,224,795 B2 5/2007 Takada et al.
7,225,256 B2 5/2007 Villavicencio
7,227,953 B2 6/2007 Shida
7,233,948 B1 6/2007 Shamoon et al.
7,234,063 B1 * 6/2007 Baugher et al. ..... 713/189
7,237,002 B1 6/2007 Estrada et al.
7,249,044 B2 7/2007 Kumar et al.
7,249,251 B2 7/2007 Todd et al.
7,260,555 B2 8/2007 Rossmann et al.
7,265,764 B2 9/2007 Alben et al.
7,266,684 B2 9/2007 Jancula
7,280,658 B2 10/2007 Amini et al.
7,281,272 B1 10/2007 Rubin et al.
7,287,055 B2 10/2007 Cannata et al.
7,287,058 B2 10/2007 Loveland et al.
7,287,620 B2 10/2007 Thomas et al.
7,290,148 B2 10/2007 Tozawa et al.
7,308,702 B1 12/2007 Thomsen et al.
7,313,824 B1 12/2007 Bala et al.
7,319,752 B2 1/2008 Asano et al.
7,331,058 B1 * 2/2008 Gladney ..... 726/2
7,340,600 B1 3/2008 Corella
7,343,488 B2 3/2008 Yadav
7,359,517 B1 4/2008 Rowe
7,362,868 B2 4/2008 Madoukh et al.
7,380,120 B1 * 5/2008 Garcia ..... 713/160
7,383,586 B2 6/2008 Cross et al.
7,386,529 B2 6/2008 Kiessig et al.
7,386,599 B1 6/2008 Piersol et al.
7,401,220 B2 7/2008 Bolosky et al.
7,406,596 B2 7/2008 Tararukhina
7,415,608 B2 8/2008 Bolosky et al.
7,434,048 B1 10/2008 Shapiro et al.
7,454,612 B2 11/2008 Bolosky et al.
7,461,157 B2 12/2008 Ahlard et al.
7,461,405 B2 12/2008 Boudreault et al.
7,478,243 B2 1/2009 Bolosky et al.
7,478,418 B2 1/2009 Supramaniam et al.
7,484,245 B1 1/2009 Friedman et al.
7,496,959 B2 2/2009 Adelstein et al.
7,509,492 B2 3/2009 Boyen et al.

(56) References Cited

U.S. PATENT DOCUMENTS 7,512,810 B1 3/2009 Ryan
7,539,867 B2 5/2009 Bolosky et al.
7,555,558 B1 6/2009 Kenrich et al.
7,562,223 B2 7/2009 Ragnet et al.
7,562,232 B2 7/2009 Zuili et al.
7,565,683 B1 7/2009 Huang et al.
7,577,838 B1 8/2009 Rossmann
7,580,919 B1 * 8/2009 Hannel et al.
7,594,262 B2 * 9/2009 Hanzlik et al. ..... 726/15
7,614,077 B2 11/2009 Brew et al.
7,631,184 B2 12/2009 Ryan
7,681,034 B1 3/2010 Lee et al.
7,698,230 B1 4/2010 Brown et al.
7,702,909 B2 4/2010 Vainstein
7,703,140 B2 4/2010 Nath et al.
7,707,427 B1 4/2010 Kenrich et al.
7,729,995 B1 6/2010 Alain et al.
7,730,543 B1 6/2010 Nath et al.
7,748,045 B2 6/2010 Kenrich et al.
RE41,546 E 8/2010 Vainstein
7,836,310 B1 11/2010 Gutnik
7,890,990 B1 2/2011 Vainstein et al.
7,913,311 B2 3/2011 Alain et al.
7,921,284 B1 * 4/2011 Kinghorn et al. ..... 713/160
7,921,288 B1 4/2011 Hildebrand
7,921,450 B1 4/2011 Vainstein et al.
7,930,756 B1 4/2011 Crocker et al.
7,950,066 B1 5/2011 Zuili
8,006,280 B1 * 8/2011 Hildebrand et al. ..... 726/1
8,065,713 B1 11/2011 Vainstein et al.
8,176,334 B2 5/2012 Vainstein
8,707,034 B1 4/2014 Ryan
2001/0000265 A1 4/2001 Schreiber et al.
2001/0011254 A1 8/2001 Clark
2001/0018743 A1 8/2001 Morishita
2001/0021255 A1 9/2001 Ishibashi
2001/0021926 A1 9/2001 Schneck et al.
2001/0023421 A1 9/2001 Numao et al.
2001/0032181 A1 10/2001 Jakstadt et al.
2001/0033611 A1 10/2001 Grimwood et al.
2001/0034839 A1 10/2001 Karjoth et al.
2001/0037290 A1 * 11/2001 Lai ..... 705/39
2001/0042110 A1 11/2001 Furusawa et al.
2001/0044903 A1 11/2001 Yamamoto et al.
2001/0056541 A1 12/2001 Matsuzaki et al. ..... G06F 21/6218 713/193
2001/0056550 A1 12/2001 Lee
2002/0003886 A1 1/2002 Hillegass et al.
2002/0004902 A1 1/2002 Toh et al.
2002/0007335 A1 1/2002 Millard et al.
2002/0007340 A1 * 1/2002 Isaf ..... G06Q 30/02 705/37
2002/0010679 A1 1/2002 Felsher
2002/0013772 A1 1/2002 Peinado
2002/0016910 A1 * 2/2002 Wright ..... G06F 21/10 713/150
2002/0016921 A1 2/2002 Olsen et al.
2002/0016922 A1 * 2/2002 Richards et al. ..... 713/200
2002/0023208 A1 2/2002 Jancula
2002/0023213 A1 * 2/2002 Walker et al. ..... 713/168
2002/0026321 A1 2/2002 Faris et al.
2002/0027886 A1 3/2002 Fischer et al.
2002/0029340 A1 3/2002 Pensak et al.
2002/0031230 A1 3/2002 Sweet et al. ..... H04L 63/0428 380/278
2002/0035624 A1 3/2002 Kim
2002/0036984 A1 3/2002 Chiussi et al.
2002/0041391 A1 4/2002 Bannai
2002/0042756 A1 4/2002 Kumar et al.
2002/0046350 A1 4/2002 Lordemann et al.
2002/0049903 A1 * 4/2002 Ussery et al. ..... 713/165
2002/0050098 A1 5/2002 Chan
2002/0052796 A1 * 5/2002 Tadokoro et al. ..... 705/26
2002/0052981 A1 5/2002 Yasuda
2002/0056042 A1 5/2002 Van Der Kaay et al.
2002/0059144 A1 5/2002 Meffert et al. ..... G06F 21/10 705/51
2002/0062240 A1 5/2002 Morinville
2002/0062245 A1 5/2002 Niu et al.
2002/0062451 A1 5/2002 Scheidt et al.
2002/0069077 A1 6/2002 Brophy et al.
2002/0069272 A1 6/2002 Kim et al.
2002/0069363 A1 6/2002 Winburn
2002/0073320 A1 6/2002 Rinkevich et al.
2002/0077986 A1 6/2002 Kobata et al.
2002/0077988 A1 6/2002 Sasaki et al.
2002/0078239 A1 6/2002 Howard et al.
2002/0078361 A1 6/2002 Giroux et al.
2002/0087479 A1 7/2002 Malcolm
2002/0089602 A1 7/2002 Sullivan
2002/0091532 A1 7/2002 Viets et al.
2002/0091745 A1 7/2002 Ramamurthy et al.
2002/0091928 A1 7/2002 Bouchard et al.
2002/0093527 A1 7/2002 Sherlock et al.
2002/0099947 A1 7/2002 Evans ..... G06F 21/6209 713/193
2002/0111885 A1 * 8/2002 Geiger et al. ..... 705/28
2002/0112035 A1 8/2002 Carey et al.
2002/0112045 A1 * 8/2002 Nirkhe et al. ..... 709/223
2002/0112048 A1 8/2002 Gruyer et al.
2002/0112168 A1 * 8/2002 Filipi-Martin et al. ..... 713/183
2002/0116649 A1 * 8/2002 Goshima ..... H04L 63/0815 726/21
2002/0120851 A1 8/2002 Clarke
2002/0124180 A1 9/2002 Hagman
2002/0129158 A1 9/2002 Zhang et al.
2002/0129235 A1 9/2002 Okamoto et al.
2002/0131601 A1 * 9/2002 Ninomiya et al. ..... 380/277
2002/0133500 A1 9/2002 Arlein et al.
2002/0133699 A1 9/2002 Pueschel
2002/0138437 A1 * 9/2002 Lewin et al. ..... 705/51
2002/0138571 A1 9/2002 Trinon et al.
2002/0138726 A1 9/2002 Samson et al.
2002/0138762 A1 9/2002 Horne
2002/0143710 A1 10/2002 Liu
2002/0143906 A1 10/2002 Tormasov et al.
2002/0150239 A1 10/2002 Carny et al.
2002/0152302 A1 10/2002 Motoyama et al.
2002/0154635 A1 * 10/2002 Liu ..... 370/392
2002/0156726 A1 10/2002 Kleckner et al.
2002/0157016 A1 10/2002 Russell et al.
2002/0162104 A1 10/2002 Raike et al.
2002/0165870 A1 11/2002 Chakraborty et al.
2002/0165960 A1 * 11/2002 Chan ..... 709/225
2002/0166053 A1 11/2002 Wilson
2002/0169866 A1 * 11/2002 Lim ..... H04L 41/0213 709/223
2002/0169963 A1 11/2002 Seder et al.
2002/0169965 A1 11/2002 Hale et al.
2002/0172367 A1 11/2002 Mulder et al.
2002/0174030 A1 11/2002 Praisner et al.
2002/0174109 A1 11/2002 Chandy et al.
2002/0174415 A1 11/2002 Hines
2002/0176572 A1 11/2002 Ananth
2002/0178271 A1 11/2002 Graham et al.
2002/0184217 A1 * 12/2002 Bisbee et al. ..... 707/9
2002/0184488 A1 12/2002 Amini et al.
2002/0194484 A1 12/2002 Bolosky et al.
2002/0198798 A1 12/2002 Ludwig et al.
2003/0005168 A1 1/2003 Leerssen et al.
2003/0009685 A1 1/2003 Choo et al.
2003/0014391 A1 1/2003 Evans et al.
2003/0018753 A1 * 1/2003 Seki ..... 709/219
2003/0023559 A1 1/2003 Choi et al.
2003/0023677 A1 * 1/2003 Morison Zuill et al. ..... 709/203
2003/0026431 A1 2/2003 Hammersmith
2003/0028610 A1 2/2003 Pearson
2003/0033528 A1 2/2003 Ozog et al.
2003/0037029 A1 2/2003 Holenstein et al.
2003/0037133 A1 2/2003 Owens
2003/0037237 A1 2/2003 Abgrall et al.
2003/0037253 A1 2/2003 Blank et al.

(56) References Cited

U.S. PATENT DOCUMENTS

2003/0046176 A1 3/2003 Hynes
2003/0046238 A1 3/2003 Nonaka et al.
2003/0046270 A1 3/2003 Leung et al.
2003/0050919 A1 3/2003 Brown et al.
2003/0051039 A1 3/2003 Brown et al.
2003/0051148 A1 3/2003 Garney
2003/0056139 A1 3/2003 Murray et al.
2003/0061482 A1 3/2003 Emmerichs
2003/0061506 A1 3/2003 Cooper
2003/0074580 A1* 4/2003 Knouse et al. ..... 713/201
2003/0078959 A1 4/2003 Yeung et al.
2003/0079120 A1* 4/2003 Hearn et al. ..... 713/150
2003/0079175 A1 4/2003 Limantsev
2003/0081773 A1* 5/2003 Sugahara et al. ..... 380/44
2003/0081784 A1 5/2003 Kallahalla et al.
2003/0081785 A1 5/2003 Boneh et al.
2003/0081787 A1 5/2003 Kallahalla et al.
2003/0081790 A1* 5/2003 Kallahalla et al. ..... 380/281
2003/0088517 A1 5/2003 Medoff
2003/0088783 A1 5/2003 DiPierro
2003/0093250 A1 5/2003 Goebel
2003/0093457 A1 5/2003 Goldick
2003/0093467 A1 5/2003 Anderson
2003/0095552 A1 5/2003 Bernhard et al.
2003/0099248 A1 5/2003 Speciner
2003/0101072 A1 5/2003 Dick et al.
2003/0110169 A1 6/2003 Zuili
2003/0110266 A1 6/2003 Rollias et al.
2003/0110280 A1 6/2003 Hinchliffe et al.
2003/0110397 A1 6/2003 Supramaniam et al.
2003/0115146 A1 6/2003 Lee et al.
2003/0115218 A1 6/2003 Bobbitt et al.
2003/0115570 A1 6/2003 Bisceglia
2003/0120601 A1 6/2003 Ouye et al. ..... G06F 21/6209 705/51
2003/0120684 A1 6/2003 Zuili et al.
2003/0126434 A1 7/2003 Lim et al.
2003/0132949 A1 7/2003 Fallon et al.
2003/0154296 A1 8/2003 Noguchi et al.
2003/0154381 A1 8/2003 Ouye
2003/0154396 A1 8/2003 Godwin et al.
2003/0154401 A1 8/2003 Hartman et al.
2003/0159048 A1 8/2003 Matsumoto et al.
2003/0159066 A1 8/2003 Staw et al.
2003/0163704 A1 8/2003 Dick et al.
2003/0165117 A1 9/2003 Garcia-Luna-Aceves et al.
2003/0172280 A1 9/2003 Scheidt et al.
2003/0177070 A1 9/2003 Viswanath et al.
2003/0177378 A1 9/2003 Wittkotter
2003/0182310 A1 9/2003 Charnock et al.
2003/0182579 A1 9/2003 Leporini et al.
2003/0182584 A1 9/2003 Banes et al.
2003/0185240 A1* 10/2003 Vuong ..... 370/474
2003/0191938 A1 10/2003 Woods et al.
2003/0196096 A1 10/2003 Sutton
2003/0197729 A1 10/2003 Denoue et al.
2003/0200202 A1 10/2003 Hsiao et al.
2003/0204692 A1 10/2003 Tamer et al.
2003/0208485 A1 11/2003 Castellanos
2003/0217264 A1* 11/2003 Martin et al. ..... 713/156
2003/0217266 A1* 11/2003 Epp et al. ..... 713/163
2003/0217281 A1* 11/2003 Ryan ..... 713/200
2003/0217282 A1 11/2003 Henry
2003/0217333 A1 11/2003 Smith et al.
2003/0220999 A1 11/2003 Emerson
2003/0222141 A1 12/2003 Vogler et al.
2003/0226013 A1 12/2003 Dutertre
2003/0229795 A1 12/2003 Kunigkeit et al.
2003/0233650 A1 12/2003 Zaner et al.
2004/0015723 A1* 1/2004 Pham et al. ..... 713/201
2004/0022390 A1 2/2004 McDonald et al.
2004/0025037 A1 2/2004 Hair
2004/0039781 A1 2/2004 LaVallee et al.
2004/0041845 A1 3/2004 Alben et al.
2004/0044908 A1* 3/2004 Markham et al. ..... 713/201
2004/0049702 A1 3/2004 Subramaniam et al.
2004/0064507 A1 4/2004 Sakata et al.
2004/0064710 A1 4/2004 Vainstein
2004/0068524 A1 4/2004 Aboulhosn et al.
2004/0068664 A1 4/2004 Nachenberg et al.
2004/0073660 A1 4/2004 Toomey
2004/0073718 A1 4/2004 Johannessen et al.
2004/0078423 A1* 4/2004 Satyavolu et al. ..... 709/203
2004/0088548 A1 5/2004 Smetters et al.
2004/0098580 A1 5/2004 DeTreville
2004/0103202 A1 5/2004 Hildebrand et al.
2004/0103280 A1 5/2004 Balfanz et al.
2004/0117371 A1 6/2004 Bhide et al.
2004/0131191 A1 7/2004 Chen et al.
2004/0133544 A1 7/2004 Kiessig et al.
2004/0158586 A1 8/2004 Tsai
2004/0186845 A1 9/2004 Fukui
2004/0193602 A1 9/2004 Liu et al.
2004/0193905 A1 9/2004 Lirov et al.
2004/0193912 A1 9/2004 Li et al.
2004/0199514 A1 10/2004 Rosenblatt et al.
2004/0205576 A1 10/2004 Chikirivao et al.
2004/0215956 A1 10/2004 Venkatachary et al.
2004/0215962 A1 10/2004 Douceur et al.
2004/0243853 A1 12/2004 Swander et al.
2004/0254884 A1 12/2004 Haber et al.
2005/0021467 A1 1/2005 Franzdonk
2005/0021629 A1 1/2005 Cannata et al.
2005/0028006 A1 2/2005 Leser et al.
2005/0039034 A1 2/2005 Doyle et al.
2005/0050098 A1 3/2005 Barnett
2005/0071275 A1 3/2005 Vainstein et al.
2005/0071657 A1 3/2005 Ryan
2005/0071658 A1 3/2005 Nath et al.
2005/0080720 A1* 4/2005 Betz et al. ..... 705/38
2005/0081029 A1 4/2005 Thornton et al.
2005/0086531 A1 4/2005 Kenrich
2005/0091289 A1 4/2005 Shappell et al.
2005/0091484 A1 4/2005 Thornton et al.
2005/0097061 A1 5/2005 Shapiro et al.
2005/0120199 A1 6/2005 Carter
2005/0138371 A1 6/2005 Supramaniam
2005/0138383 A1 6/2005 Vainstein
2005/0168766 A1 8/2005 Troyansky et al.
2005/0177716 A1 8/2005 Ginter et al.
2005/0177858 A1 8/2005 Ueda
2005/0198326 A1 9/2005 Schlimmer et al.
2005/0223242 A1 10/2005 Nath
2005/0223414 A1 10/2005 Kenrich et al.
2005/0235154 A1 10/2005 Serret-Avila
2005/0256909 A1 11/2005 Aboulhosn et al.
2005/0268033 A1 12/2005 Ogasawara et al.
2005/0273600 A1 12/2005 Seeman
2005/0283610 A1 12/2005 Serret-Avila et al.
2005/0288961 A1 12/2005 Tabrizi
2006/0005021 A1 1/2006 Torrubia-Saez
2006/0011400 A1 1/2006 Thomas
2006/0075258 A1 4/2006 Adamson et al.
2006/0075465 A1 4/2006 Ramanathan et al.
2006/0093150 A1 5/2006 Reddy et al.
2006/0101285 A1 5/2006 Chen et al.
2006/0149407 A1 7/2006 Markham et al.
2006/0168147 A1 7/2006 Inoue et al.
2006/0184637 A1 8/2006 Hultgren et al.
2006/0230437 A1 10/2006 Boyer et al.
2006/0277316 A1 12/2006 Wang et al.
2007/0006214 A1 1/2007 Dubal et al.
2007/0067837 A1 3/2007 Schuster
2007/0083575 A1 4/2007 Leung et al.
2007/0192478 A1 8/2007 Louie et al.
2007/0193397 A1 8/2007 Hwan
2007/0294368 A1 12/2007 Bomgaars et al.
2008/0075126 A1 3/2008 Yang
2009/0254843 A1 10/2009 Van Wie et al.
2010/0047757 A1 2/2010 McCurry et al.
2010/0199088 A1 8/2010 Nath
2017/0118214 A1 4/2017 Vainstein et al.

(56) References Cited

U.S. PATENT DOCUMENTS

FOREIGN PATENT DOCUMENTS

| | | | |
|---|---|---|---|
| EP | 0 809 170 | A1 | 11/1997 |
| EP | 0 913 966 | A2 | 5/1999 |
| EP | 0 913 967 | A2 | 5/1999 |
| EP | 0 950 941 | A2 | 10/1999 |
| EP | 0 950 941 | A3 | 10/1999 |
| EP | 1 107 504 | A2 | 6/2001 |
| EP | 1 107 504 | B1 | 6/2001 |
| EP | 1 130 492 | A2 | 9/2001 |
| EP | 1 154 348 | A2 | 11/2001 |
| EP | 1 324 565 | A1 | 7/2003 |
| GB | 2 328 047 | A | 2/1999 |
| JP | 2001-036517 | A | 2/2001 |
| JP | 2006-244044 | A | 9/2006 |
| JP | 2009-020720 | A | 1/2009 |
| WO | WO 96/41288 | A1 | 12/1996 |
| WO | WO 00/56028 | A2 | 9/2000 |
| WO | WO 01/61438 | A2 | 8/2001 |
| WO | WO 01/63387 | A3 | 8/2001 |
| WO | WO 01/77783 | A2 | 10/2001 |
| WO | WO 01/78285 | A1 | 10/2001 |
| WO | WO 01/84271 | A2 | 11/2001 |
| WO | WO 01/63387 | A | 8/2007 |
| WO | WO 01/63387 | A2 | 8/2007 |

OTHER PUBLICATIONS

Adobe Acrobat Security Settings, Acrobat 7.0, Nov. 15, 2004, pp. 1-4.

"Affect," The American Heritage Dictionary of the English Language, Fourth Edition, Houghton Mifflin Company, 2002. Retrieved May 4, 2006 from http://dictionary.reference.com/search?q=affect, 9 pages.

Boneh et al., "IBE Secure E-mail," Stanford University, Apr. 8, 2002, http://crypto.stanford.edu/ibe/, 3 pages.

Boneh, D., et al., "Identity-Based Encryption from the Weil Pairing", CRYPTO '01 Proceedings of the 21st Annual International Cryptology Conference on Advances in Cryptology, Springer-Verlag London, UK, Oct. 2001, 27 pages.

"Columns," Microsoft TechNet http://web.archive.org/web/20021014225142/www.microsoft.com/techneUcolumns/default.asp Oct. 14, 2002, Retrieved from web.archive.org on Dec. 3, 2009, 1 page.

"Column Archives," Microsoft TechNet, Professor Windows, technet.microsoft.com/menus/library/bb878075.aspx, retrieved on Dec. 3, 2009, 3 pages.

Curtis, et al., "Securing the Global, Remote, Mobile User," 1999 John Wiley & Sons, Ltd., Int. J. Network Mgmt. 9, pp. 9-21.

Definition of markup, in Foldoc (Free on Line Dictionary of Computing), 2010, 1 page.

"Encrypting File System," from MSDN Oct. 2001 version, exact publication date is unknown but believed prior to Dec. 12, 2001, 2 pages.

English language translation (unverified, machine-generated) of Japanese Patent Publication No. 2009-020720, Japanese Patent Office, Patent & Utility Model Gazette DB, 2009, 36 pages.

Examination Report, completion date Jun. 18, 2008, for European Patent Application No. EP 02 258 532.7-1244, 6 pgs.

"eXPeriencing Remote Assistance" Microsoft TechNet—Professor Windows Oct. 2002 Oct. 15, 2002 http://web.archive.org/web/20021015165237/www.microsoft.com/techneUcolumns/profwin/, Retrieved from web.archive.org on Dec. 3, 2009, 18 pages.

Expiration Mechanism for Chipcards, IBM Technical Disclosure Bulletin, Oct. 1, 2001, UK, 1 page.

"Features of EFS" from MSDN Oct. 2001 version, exact publication date is unknown but believed prior to Dec. 12, 2001, 2 pages.

"How EFS works," from MSDN Oct. 2001 version, exact publication date is unknown but believed prior to Dec. 12, 2001, 4 pages.

"Inside Encrypting file system," Part 1, from MSDN Oct. 2001 version, exact publication date is unknown but believed prior to Dec. 12, 2001, 6 pages.

"Inside Encrypting file system," Part 2, from MSDN Oct. 2001 version, exact publication date is unknown but believed prior to Dec. 12, 2001, 7 pages.

Juvva et al., "A Real-Time Push-Pull Communications Model for Distributed Real-Time and Multimedia Systems," CMU-CS-99-107, School of Computer Sciences, Carnegie Mellon University, Pittsburgh, PA, Jan. 1999, 25 pages.

McDaniel et al. "AntigonE: A Flexible Framework for Secure Group Communication," Proceedings of the 8th USENIX Security Symposium, Aug. 23, 1999, 15 pages.

Microsoft Press Computer Dictionary, 1997, Microsoft Press, Third Edition, 3 pages.

Microsoft Windows 2000 server. Windows 2000 Group Policy White Paper, 2000, 137 pages.

"Migrating Accounts From Windows NT 4.0 Domains to Windows 2000," Microsoft TechNet—Professor Windows Apr. 2002, http://web.archive.org/web/20020415004611/www. m icrosoft.com/tech netlcolumns/profwin/, Apr. 15, 2002, 4 pages.

Office Action, dated May 10, 2005, for European Patent Application No. 02258532.7, 6 pages.

Office Action, dated Dec. 5, 2006, for European Patent Application No. 02258532.7, European Patent Office, 5 pags.

"Scripting Your Windows 2000 Network, Part 1" Microsoft TechNet—Professor Windows Jun. 2002, http://web.archive.org/web/20020622055532/www.microsoft.com/techneUcolumns/profwin/ Retrieved from web.archive.org on Dec. 3, 2009, 4 pages.

Search Report, completion date Apr. 14, 2005, for European Patent Application No. EP 02 25 8533, 2 pages.

Search Report, completion date Jul. 6, 2005, for European Patent Application No. EP 02 25 8529, 4 pages.

Search Report, completion date Mar. 16, 2005, for European Patent Application No. EP 02 25 8534, 2 pages.

Search Report, completion date Mar. 2, 2005, for European Patent Application No. EP 02 25 8535, 2 pages.

Search Report, completion date Mar. 3, 2005, for European Patent Application No. EP 02 25 8537, 2 pages.

Search Report, completion date May 12, 2005, for European Patent Application No. EP 02 25 8539, 2 pages.

Search Report, completion date May 8, 2003, for European Patent Application No. EP 02 25 8530, 2 pages.

Search Report, completion date May 8, 2003, for European Patent Application No. EP 02 25 8540, 2 pages.

Search Report, completion date Oct. 2, 2003, for European Patent Application No. EP 02 25 8531, 2 pages.

Search Report, completion date Oct. 8, 2003, for European Patent Application No. EP 02 25 8536, 2 pages.

"Secure Sockets Layer (SSL): How it Works," Verisign, http://www.verisign.com/ss/ssl-information-center/how-ssl-security-works, pp. 1-2.

"Security Options". Dec. 20, 2001. DC & Co. pp. 1-2.

"Security with Encrypting File System," from MSDN Oct. 2001 version, exact publication date is unknown but believed prior to Dec. 12, 2001, 2 pages.

Stallings, William, "Cryptography and Network Security: Principles and Practice," 1999, pp. 333-337, Second Edition, Prentice Hall, Upper Saddle River, New Jersey.

Symantec. Norton Antivirus Corporate Edition Implementation Guide, 1999, 42 pages.

"WayBack Machine" web.archive.org, http://web.archive.org/web/*/http://www.microsoft.com/technetlcolumns/profwin/, Retrieved on Dec. 3, 2009, 1 page.

"Windows 2000 EFS" in the Apr. 1999 issue of Windows NT magazine, 1 page.

Boneh et al., "Hierarchical Identity Based Encryption with Constant Size Ciphertext," Advances in Cryptology—EUROCRYPT 2005, vol. 3493, Jun. 20, 2005, pp. 440-456.

English language abstract for Japanese Appl. Pub. No. 2006-244044, published Sep. 14, 2006, 1 pg.

English language abstract for Japanese Appl. Pub. No. 2009-020720, published Jan. 29, 2009, 1 pg.

(56) References Cited

OTHER PUBLICATIONS

English language translation (unverified, machine-generated) of Japanese Patent Publication No. JP 2006-244044, Japanese Patent Office, Patent & Utility Model Gazette DB, 2006, 15 pages.
Botha et al., "Access Control in Document-Centric Workflow Systems—An Agent—Based Approach," Computers & Security, vol. 20:6, Sep. 2001, pp. 525-532.
Botha et al., "Separation of Duties for Access Control Enforcement in Workflow Environments," IBM, 2001, 17 pages.
English language abstract for Japanese Appl. Pub. No. 2001-036517, filed Sep. 2, 2001, 1 pg.
U.S. Appl. No. 10/028,397, Zuili, "Method and System for restricting use of a clipboard application," filed Dec. 21, 2001, 48 pages.
U.S. Appl. No. 10/074,804, entitled "Secured Data Format for Access Control," Garcia, Feb. 12, 2002, 108 pgs.
U.S. Appl. No. 10/074,825, entitled "Method and Apparatus for Accessing Secured Electronic Data Off-line," Lee et al., Feb. 12, 2002, 108 pgs.
U.S. Appl. No. 10/074,996, entitled "Method and Apparatus for Securing Electronic Data," Lee et al., Feb. 12, 2002, 111 pgs.
U.S. Appl. No. 10/075,194, entitled "System and Method for Providing Multi-location Access Management to Secured Items," Vainstein et al., Feb. 12, 2002, 110 pgs.
U.S. Appl. No. 10/105,532, entitled "System and Method for Providing Different Levels of Key Security for Controlling Access to Secured Items," Hildebrand et al., Mar. 20, 2002, 86 pgs.
U.S. Appl. No 10/159,220, entitled "Method and system for protecting electronic data in enterprise environment," Kinghorn, May 31, 2002, 62 pages.
U.S. Appl. No. 10/186,203, entitled "Method and System for Implementing Changes to Security Policies in a Distributed Security System," Huang, Jun. 26, 2002, 65 pgs.
U.S. Appl. No. 10/201,756, entitled "Managing Secured Files in Designated Locations," Alain, Jul. 22, 2002, 121 pgs.
U.S. Appl. No. 10/206,737, entitled "Method and System for Updating Keys in a Distributed Security System" (now abandoned), Hildebrand, Jul. 26, 2002, 60 pgs.
U.S. Appl. No. 10/242,185, entitled "Method and system for fault-tolerant transfer of files across a network," Ryan, Sep. 11, 2002, 33 pgs.
U.S. Appl. No. 10/246,079, entitled "Security System for Generating Keys from Access rules in a Decentralized Manner and Methods Therefor," Hildebrand, Sep. 17, 2002, 78 pgs. (now U.S. Patent No. 8,006,280, issued Aug. 23, 2011).
U.S. Appl. No. 10/259,075, entitled "Effectuating Access Policy Changes to Designated Places for Secured Files," Crocker, Sep. 27, 2002, 60 pgs.
U.S. Appl. No. 10/286,524, entitled "Security system that uses indirect password-based encryption," Gutnik, Nov. 1, 2002, 38 pgs.
U.S. Appl. No. 10/286,575, entitled "Method and Archictecture for Providing Access to Secured Data from Non-Secured Clients," Vainstein, Nov. 1, 2002, 46 pgs.
U.S. Appl. No. 10/295,363, entitled "Security Using Indirect Key Generation from Access Rules and Methods Therefor," Vainstein, Nov. 15, 2002, 70 pgs.
U.S. Appl. No. 10/325,013, entitled "Hybrid systems for securing digital assets," Rossman, Dec. 20, 2002, 45 pages.
U.S. Appl. No. 10/325,102, entitled "Method and apparatus for securing/unsecuring files by file crawling," Prakash, Dec. 20, 2002, 76 pages.
U.S. Appl. No. 10/327,320, entitled "Security system with staging capabilities," Vainstein, Dec. 20, 2002, 39 pgs.
U.S. Appl. No. 10/368,277, Michael Michio Ouye, "Methods and Systems for Tracking User Actions on Files," filed Feb. 18, 2003, 35 pages.
U.S. Appl. No. 10/404,566, entitled "Multi-level cryptographic transformations for securing digital assets," Crocker et al., Mar. 31, 2003, 65 pages.
U.S. Appl. No. 10/405,587, entitled "Method and system for securing digital assets using content type designations," Nath, Apr. 1, 2003, 49 pages.
U.S. Appl. No. 10/448,806, entitled "Method and System for Using Remote Headers to Secure Electronic Files," Ryan, May 30, 2003, 35 pgs.
U.S. Appl. No. 10/610,832, entitled "Method and system for enabling users of a group shared across mulitple file security systems to access secured files," Ryan, Jun. 30, 2003, 33 pgs.
U.S. Appl. No. 10/642,041, entitled "Method and system for fault-tolerant transfer of files across a network," Kenrich, Aug. 15, 2003, 32 pgs.
U.S. Appl. No. 10/889,685, entitled "Method and Apparatus for Controlling the Speed Ranges of a Machine," Thomas, Jul. 31, 2004, 18 pgs.
U.S. Appl. No. 10/894,493, entitled "Multi-Level File Digest," Kenrich, Jul. 19, 2004.
U.S. Appl. No. 11/797,367, entitled "Method and System for Managing Security Tiers," Vainstein, May 2, 2007, 11 pgs.
U.S. Appl. No. 11/889,310, entitled "Methods and Systems for Providing Access Control to Electronic Data," Rossmann et al., Aug. 10, 2007, 90 pgs.

* cited by examiner

DOCUMENT SECURITY SYSTEM THAT PERMITS EXTERNAL USERS TO GAIN ACCESS TO SECURED FILES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This is a Division of U.S. application Ser. No. 10/262,218, filed Sep. 30, 2002, now allowed, which is hereby incorporated by reference in its entirety for all purposes.

U.S. application Ser. No. 10/262,218 is related to U.S. patent application Ser. No. 10/075,194, filed Feb. 12, 2002, now U.S. Pat. No. 8,065,713 issued on Nov. 22, 2011 and entitled "SYSTEM AND METHOD FOR PROVIDING MULTI-LOCATION ACCESS MANAGEMENT TO SECURED ITEMS," which is hereby incorporated by reference in its entirety for all purposes.

BACKGROUND OF THE INVENTION

1. Field of the Invention

The present invention relates to security systems for data and, more particularly, to security systems that protect data in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is an open, public and international network of interconnected computers and electronic devices. Without proper security measures, an unauthorized person or machine may intercept any information traveling across the Internet, and may even get access to proprietary information stored in computers that interconnect to the Internet, but are otherwise generally inaccessible by the public.

As organizations become more dependent on networks for business transactions, data sharing, and everyday communications, their networks have to be increasingly accessible to customers, employees, suppliers, partners, contractors and telecommuters. Unfortunately, as the accessibility increases, so does the exposure of critical data that is stored on the network. Hackers can threaten all kinds of valuable corporate information resources including intellectual property (e.g., trade secrets, software code, and prerelease competitive data), sensitive employee information (e.g., payroll figures and HR records), and classified information (e.g., passwords, databases, customer records, product information, and financial data). Thus data security is becoming increasingly mission-critical.

There are many efforts in progress aimed at protecting proprietary information traveling across the Internet and controlling access to computers carrying the proprietary information. Every day hundreds of thousands of people interact electronically, whether it is through e-mail, e-commerce (business conducted over the Internet), ATM machines or cellular phones. The perpetual increase of information transmitted electronically has led to an increased reliance on cryptography.

In protecting the proprietary information traveling across the Internet, one or more cryptographic techniques are often used to secure a private communication session between two communicating computers on the Internet. Cryptographic techniques provide a way to transmit information across an unsecure communication channel without disclosing the contents of the information to anyone eavesdropping on the communication channel. An encryption process is a cryptographic technique whereby one party can protect the contents of data in transit from access by an unauthorized third party, yet the intended party can read the data using a corresponding decryption process.

Many organizations have deployed firewalls, Virtual Private Networks (VPNs), and Intrusion Detection Systems (IDS) to provide protection. Unfortunately, these various security means have been proven insufficient to reliably protect proprietary information residing on their internal networks. For example, depending on passwords to access sensitive documents from within often causes security breaches when the password of a few characters long is leaked or detected.

Enterprise security solutions secure data within an enterprise premise (e.g., internal networks). Some enterprise security solutions prohibit external users (clients) to have any access to secure data. Unfortunately, such enterprise security solutions are not suitable for use in a collaborative environment in which both regular internal users (e.g., employees) and external users (e.g., consultants) need to access some secured data of the enterprise.

Thus, there is a need for improved approaches to enable file security systems to permit external users to access secured data without compromising the integrity of an enterprise security system.

SUMMARY OF THE INVENTION

The invention relates to an improved system and approaches for exchanging secured files (e.g., documents) between internal users of an organization and external users. A file security system of the organization operates to protect the files of the organization and thus prevents or limits external users from accessing internal documents. Although the external users are unaffiliated with the organization (i.e., not employees or contractors), the external users often have working relationships with internal users. These working relationships (also referred to herein as partner relationships) often present the need for file (document) exchange. According to one aspect of the invention, external users having working relationships with internal users are able to be given limited user privileges within the file security system, such that restricted file (document) exchange is permitted between such internal and external users.

The invention can be implemented in numerous ways, including as a method, system, device, and computer readable medium. Several embodiments of the invention are discussed below.

An embodiment of the present invention provides a system that includes a server including an access manager configured to restrict access to files of an organization and maintain at least encryption keys for internal and external users and an external access server operatively connected to the server and coupled between the server and a data network. The data network is configured to allow the external users use of the external access server. In addition, the external access server is configured to permit file exchange between the internal users and the external users via the server.

Another embodiment of the present invention provides a method that includes restricting access to files in a server including an access manager that restricts access to files of an organization and maintains at least encryption keys for internal and external users, permitting file exchange between the internal users and the external users through an external access server operatively connected to the server and coupled between the server and a data network and using the data network to allow the external users to interact with the external access server.

A further embodiment of the present invention provides a computer-readable storage device having instructions stored thereon, execution of which, by a computing device, causes the computing device to perform operations including restricting access to files in a server, including an access manager that restricts access to files of an organization and maintains at least encryption keys for internal and external users, permitting file exchange between the internal users and the external users through an external access server operatively connected to the server and coupled between the server and a data network and using the data network to allow the external users to interact with the external access server.

Other objects, features, and advantages of the present invention will become apparent upon examining the following detailed description of an embodiment thereof, taken in conjunction with the attached drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
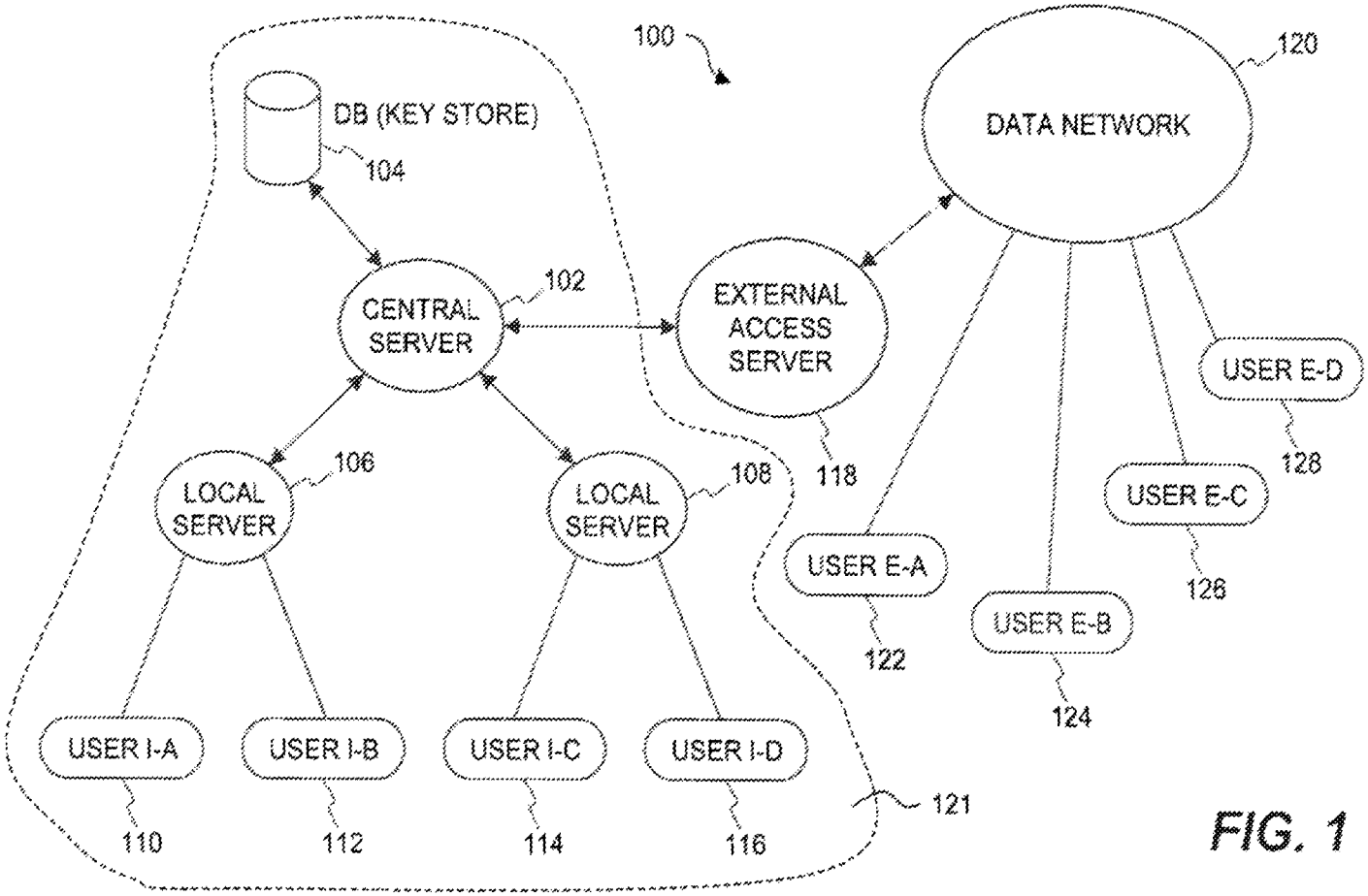
FIG. 1 is a block diagram of a document security system according to one embodiment of the invention.

The invention relates to an improved system and approaches for exchanging secured files (e.g., documents) between internal users of an organization and external users. A file security system of the organization operates to protect the files of the organization and thus prevents or limits external users from accessing internal documents. Although the external users are unaffiliated with the organization (i.e., not employees or contractors), the external users often have working relationships with internal users. These working relationships (also referred to herein as partner relationships) often present the need for file (document) exchange. According to one aspect of the invention, external users having working relationships with internal users are able to be given limited user privileges within the file security system, such that restricted file (document) exchange is permitted between such internal and external users. The invention is suitable for use in an enterprise file security system.

A file security system (or document security system) serves to limit access to files (documents) to authorized users. Often, an organization, such as a company, would use a file security system to limit access to its files (documents). For example, users of a group might be able to access files (documents) pertaining to the group, whereas other users not within the group would not be able to access such files (documents). Such access, when permitted, would allow a user of the group to retrieve a copy of the file (document) via a data network.

As used herein, a user may mean a human user, a software agent, a group of users, member of a group of users, a device and/or application. Besides a human user who needs to access a secured document, a software application or agent sometimes needs to access secured files in order to proceed. Accordingly, unless specifically stated, the "user" as used herein does not necessarily pertain to a human being.

Secured files are files that require one or more keys, passwords, access privileges, etc. to gain access to their content. According to one aspect of the invention, the security is provided through encryption and access rules. The files, for example, can pertain to documents, multimedia files, data, executable code, images and text. In general, a secured file can only be accessed by authenticated users with appropriate access rights or privileges. In one embodiment, each secured file is provided with a header portion and a data portion, where the header portion contains or points to security information. The security information is used to determine whether access to associated data portions of secured files is permitted.

In the following description, numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-9. However, those skilled in the art will readily appreciate that the detailed description given herein with respect to these figures is for explanatory purposes as the invention extends beyond these limited embodiments.

FIG. 1 is a block diagram of a document security system 100 according to one embodiment of the invention. The document security system 100 is responsible for providing protection of electronic data in an organization and includes a central server 102 that controls the overall operation of the document security system 100. The central server 102 imposes restrictions on the access to secured documents that are stored centrally or locally.

The central server 102 is assisted by a key store 104. Among other things, the key store 104 can store key pairs (public and private keys). In one embodiment, the key store 104 can be implemented in a database that stores key pairs (among other things). The central server 102 is also assisted by local servers 106 and 108 that can provide distributed access control. Various internal users to an organization that are utilizing the document security system 100 interact with the central server 102 and/or one of the local servers 106 and 108. These internal users are represented by users 110-116. As illustrated in the embodiment shown in FIG. 1, user I-A 110 and user I-B 112 are affiliated with the local server 106, and user I-C 114 and user I-D 116 are affiliated with the local server 108. It should be understood, however, that various other arrangements or configurations of local servers and users can be utilized.

The document security system 100 also facilitates access by external users to secured documents that are maintained by the document security system 100. In this regard, the document security system 100 includes an external access server 118. The external access server 118 allows external users to be granted access to some of the secured documents. More particularly, the external access server 118 is coupled between a private network 121 in the document security system 100 and a (public) data network 120 and thus facilitates the access from external users 122-128 to some of the secured files without compromising the security integrity of the document security system 100. The data network 120 is, for example, a global computer network, a wide area network or a local area network. However, since the external users 122-128 are not directly affiliated with the organization, the external users are therefore often given limited access rights to some of the secured documents from machines coupled to the data network 120. Although the document security system 100 shown in FIG. 1 illustrates multiple local servers 106 and 108, multiple internal users 110-116, multiple external users 122-128, it should be recognized that the document security system 100 can, more generally, utilize zero or more local servers, one or more internal users, and one or more external users.

According to one embodiment of the invention, external users are permitted to be members of user groups maintained by the central server 102. As such, the external users are able to exchange certain secured documents with internal users. In one embodiment, the exchange of the secured documents between internal and external users is limited to exchanges between members of a common user group. Despite document exchange capabilities, the external users are unable to perform various operations with respect to user groups that internal users would be able to perform. For example, external users would be unable to change group membership or to query group membership to determine who are the members of the user group. Typically, an external user would be added to a particular user group when a relationship between the organization and the external user is arranged. The exchange of documents between internal users and external users is secured using public key encryption. The document security system 100 manages the storage and accessibility of public and private keys for the internal and external users. The document security system 100 can advantageously minimize the client software needed at the machines utilized by the external users.

The invention facilitates exchange of files (e.g., documents) between internal users of an organization and external users. Although the external users are unaffiliated with the organization (i.e., not employees or contractors), the external users often have working relationships with internal users. These working relationships (also referred to herein as partner relationships) often present the need for file (document) exchange. A file security system (e.g., document security system 100) of the organization operates to protect the files of the organization and thus prevents or limits external users from accessing internal documents. According to the invention, external users having working relationships with internal users are able to be given limited user privileges within a file security system such that restricted file (document) exchange is permitted between such internal and external users.

Figure 2:
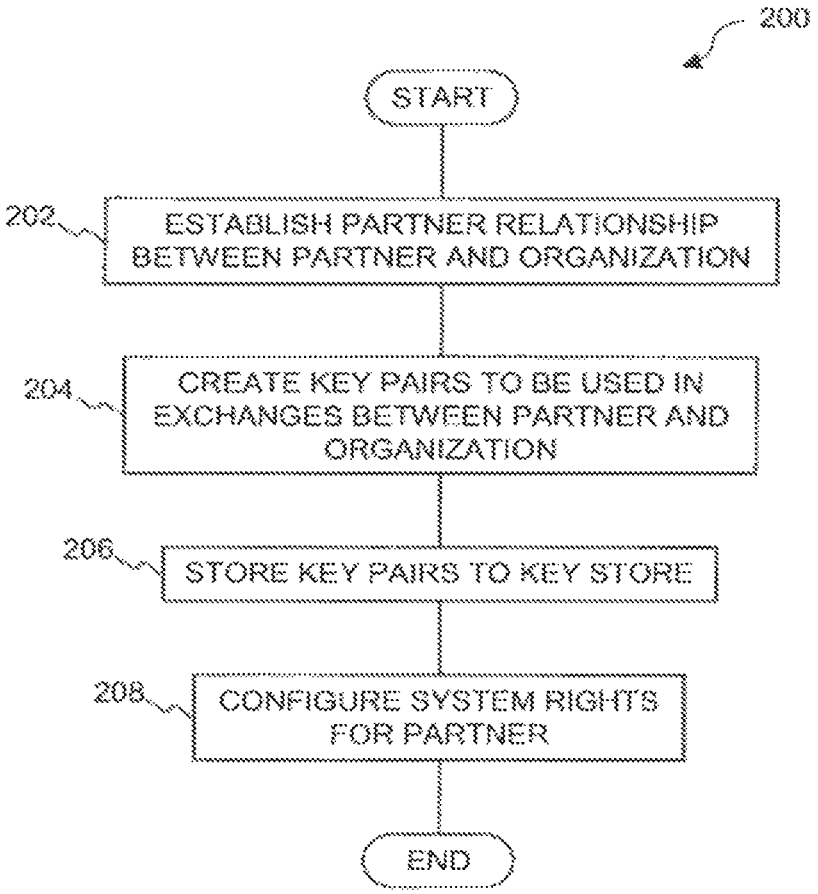
FIG. 2 is a flow diagram of relationship setup processing according to one embodiment of the invention.

FIG. 2 is a flow diagram of relationship setup processing 200 according to one embodiment of the invention. The relationship setup processing 200 operates to arrange or set up a partner relationship between a partner and an organization (e.g., company). The organization is typically represented by an internal user or a group of users, and the partner is typically represented by one or more external users.

The relationship setup processing 200 initially establishes 202 a partner relationship between a partner and an organization. In this context, the organization is deemed to protect various documents of the organization and its various internal users. In one embodiment, the organization uses a file (document) security system to protect the various documents. The partner is deemed external to the organization. However, the partner is desirous of exchanging documents with the organization. The partner relationship between the partner and the organization (or between respective members thereof) is such that document exchange is permitted so that mutual business objectives can be efficiently achieved. After the partner relationship has been established 202, key pairs are created 204. The key pairs are used in document exchanges between the partner and the organization (e.g., between respective individuals thereof). For example, each of the partner and the organization would have a public key for encryption, as well as a private key for decryption. For example, to release a document from the organization to the partner, the organization would secure (e.g., encrypt) the document using the public key of the partner and then, upon acquiring the secured document, the partner would unsecure (e.g., decrypt) the secured document using its private key. Similarly, when the partner releases a document to the organization, the partner can secure (e.g., encrypt) the document using the public key of the organization and then, upon acquiring the secured document, the organization can unsecure (e.g., decrypt) the document using its private key. After the key pairs are created 204, the key pairs can be stored 206 to a key store. In one embodiment, the key store is within the file security system. System rights for the partner can then be configured 208. The system rights can be configured to permit limited access privileges to the partner. For example, the partner can be configured to include one or more of its employees within a user group maintained for the organization. After the system rights have been configured 208, the relationship setup processing 200 ends.

According to one embodiment, a partner relationship between an organization and a partner can confer on the partner: (i) query rights, and (ii) rights to get public keys of the organization. For example query right might include the right to get members of a group used by the file security system. However, having the right to get public keys of the organization does not give access to secured documents of the organization.

Figure 3:
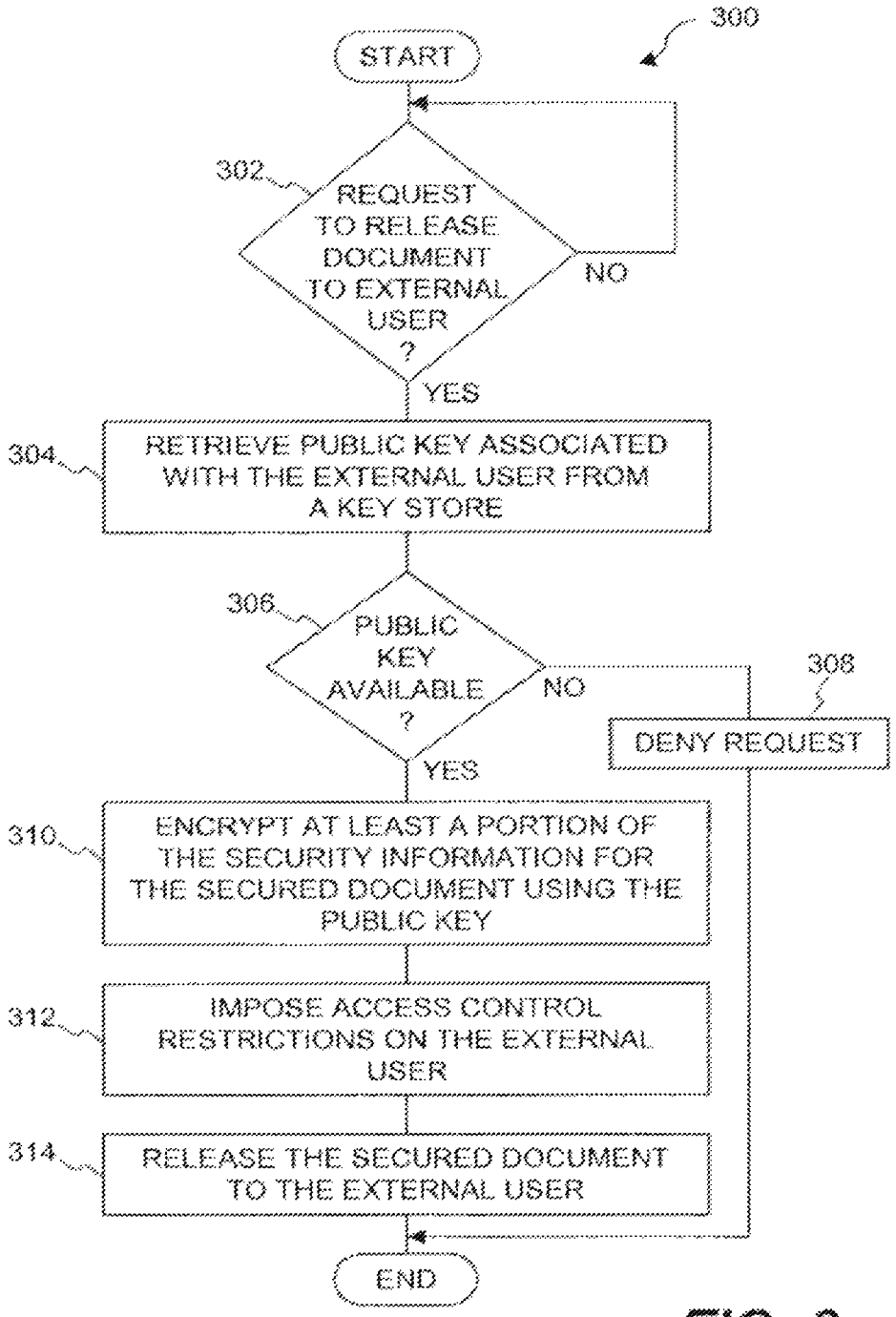
FIG. 3 is a flow diagram of document delivery processing according to one embodiment of the invention.

FIG. 3 is a flow diagram of document delivery processing 300 according to one embodiment of the invention. The document delivery processing 300 serves to deliver a secured document from an internal user to an external user. The internal user is associated with an organization, and the external user is associated with the partner.

The document delivery processing 300 begins with a decision 302 that determines whether a request to release a document to an external user has been received. In one embodiment, the request to release a document to an external user is initiated by an internal user. When the decision 302 determines that a request to release a document to an external user has not yet been received, the document delivery processing 300 awaits such a request. In other words, the document delivery processing 300 can be considered to be invoked when a request to release a document to an external user is received.

After a request to release a document to an external user has been received, a public key associated with the external user is retrieved 304 from a key store. In general, the key store serves to store a plurality of keys utilized by a document security system of the organization. In one embodiment, the key store can be the key store 104 illustrated in FIG. 1. Next, a decision 306 determines whether a public key associated with the external user was available from the key store. In one embodiment, the availability of the public key is controlled by the partner relationship. When the decision 306 determines that the key store does not have a public key associated with the external user, then the document is not permitted to be delivered to the external user and thus the request is denied 308. Here, the particular external user is deemed not authorized to exchange documents with either the organization in general, or an internal user in particular.

On the other hand, when the decision 306 determines that a public key associated with the external user is available from the key store, then at least a portion of security information for the secured document is encrypted 310 using the public key. In one embodiment, the secured document that is to be delivered to the external user has a security information portion (also known as a header portion) and a data portion. The security information portion includes the security information providing restrictive access to the secured document. The security information may include access control components, such as keys or access rules that are utilized to control access to the data portion of the secured document. When the decision 306 determines that a public key is available, then at least a part of the security information portion for the secured document is encrypted 310 using the public key. Then, access control restrictions can be imposed 312 on the external user. The access control restrictions can limit the type, character or extent of access that the external user is granted with respect to the secured document. For example, the access control restrictions can be imposed by providing access rules within the security information portion of the secured document. After the access control restrictions are imposed 312 and encryption 310 with the public key, the secured document is released 314 to the external user. In one embodiment, the secured document is released 314 by being transmitted. Typically, the transmission of the secured document to the external user is performed through one or more networks (e.g., data networks). After the secured document has been released 314 to the external user (or after operation 308 when the request to deliver the secured document to the external user is denied), the document delivery processing 300 is complete and ends.

Figure 4:
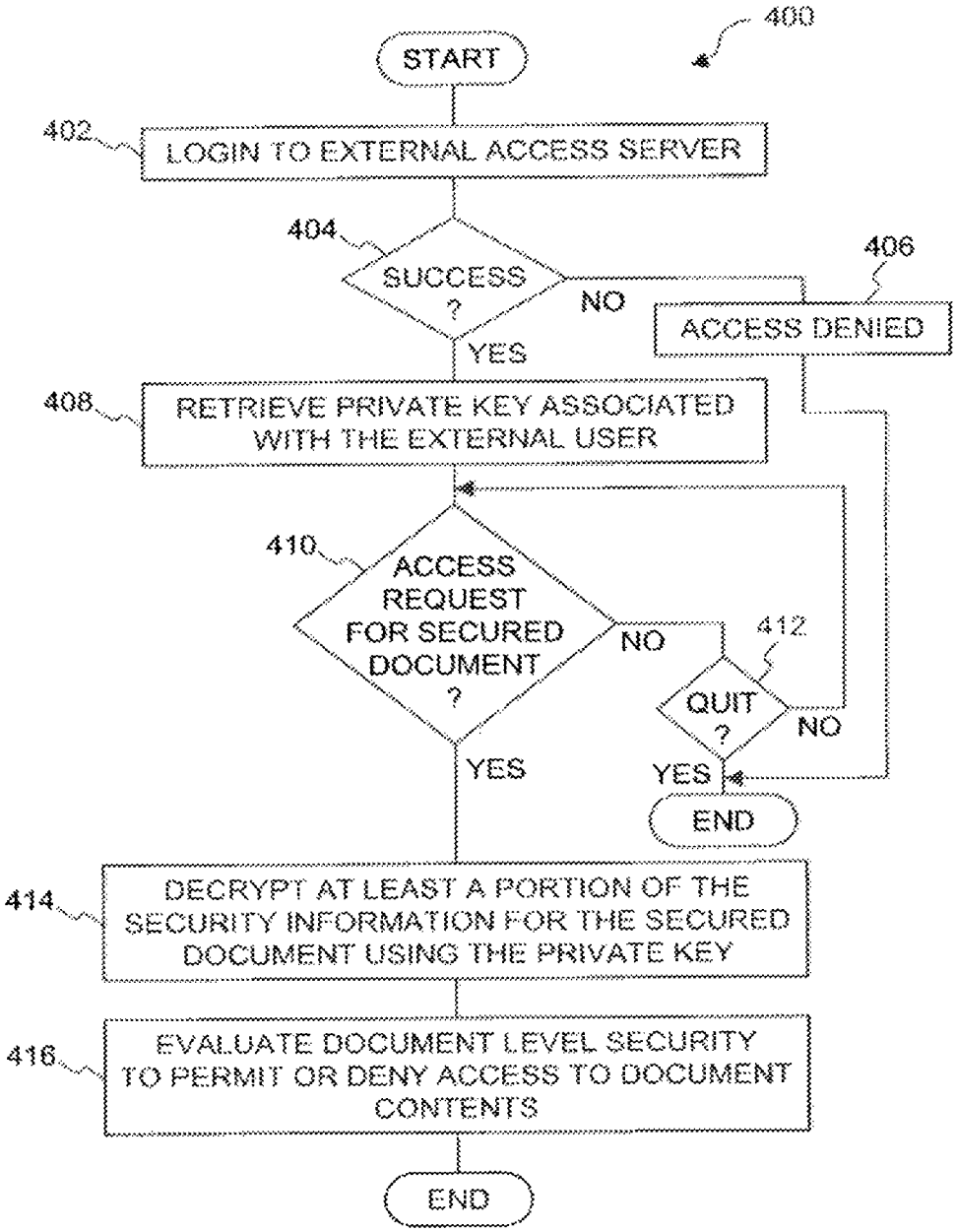
FIG. 4 is a flow diagram of document access processing according to one embodiment of the invention.

FIG. 4 is a flow diagram of document access processing 400 according to one embodiment of the invention. The document access processing 400 involves an external user accessing a secured document that has been made available to the external user by an internal user.

The document access processing 400 begins with the external user acting to login 402 to an external access server. The external access server is associated with the document security system and utilized to permit limited external access to the document security system. As an example, the external access server can be the external access server 118 illustrated in FIG. 1.

A decision 404 then determines whether the login 402 has been successful. When the decision 404 determines that login has not been successful, then access is denied 406 to the external access server and no secured documents are made available to external users. Following the operation 406, the document access processing 400 is complete and ends as the external user was unable to successfully log into the external access server.

On the other hand, when the decision 404 determines that the external user has successfully logged into the external access server, then a private key associated with the external user is retrieved 408. In one embodiment, the private key is downloaded from the document security system via the external access server. In another embodiment, the private key is recovered locally.

Next, a decision 410 determines whether an access request for an encrypted document has been received. When the decision 410 determines that an access request for the secured document has not yet been received, a decision 412 determines whether the document access processing 400 should end. When the decision 412 determines that the document access processing 400 should not end, then the document access processing 400 returns to repeat the decision 410 and subsequent operations. On the other hand, when the decision 412 determines that the document access processing 400 should end, then the document access processing 400 is complete and ends.

Alternatively, when the decision 410 determines that an access request for the secured document has been received, then at least a portion of the security information for the secured document is decrypted 414 using the private key. Next, document level security is evaluated 416 to permit or deny access to the document contents. Following the operation 416, the document access processing 400 is complete and ends.

Figure 5:
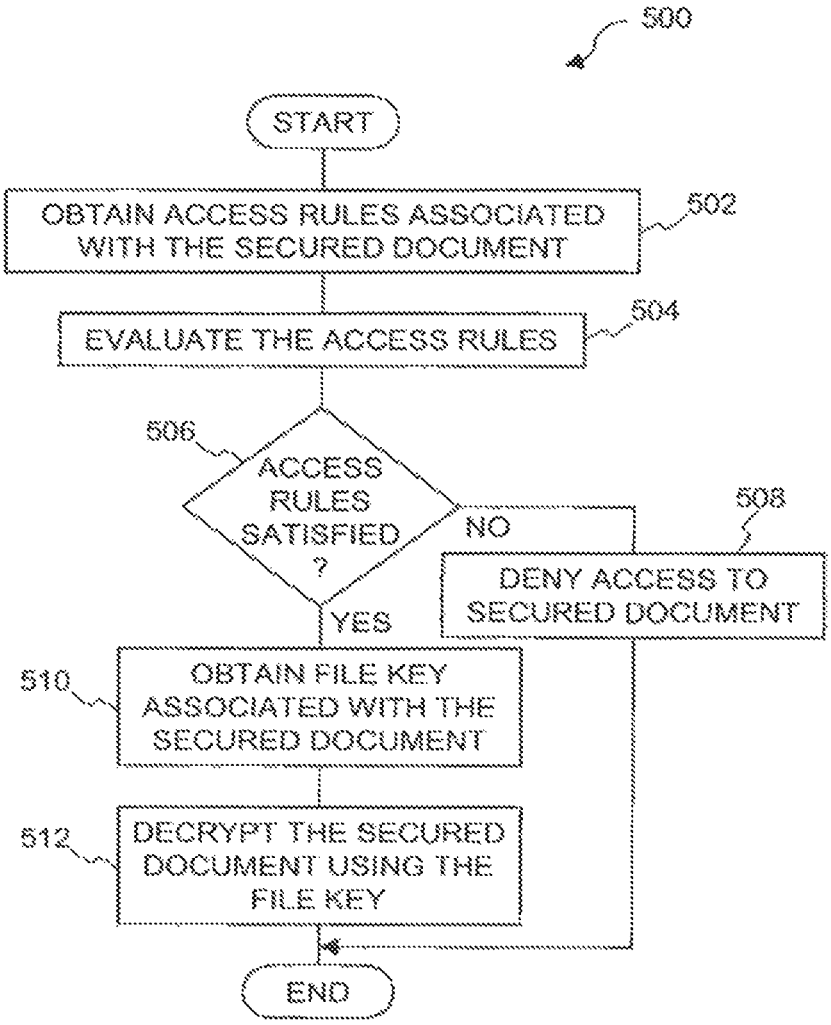
FIG. 5 is a flow diagram of access control processing according to one embodiment of the invention.

FIG. 5 is a flow diagram of access control processing 500 according to one embodiment of the invention. The access control processing 500 is, for example, suitable for use as the operations carried out by the operation 416 illustrated in FIG. 4.

The access control processing 500 initially obtains 502 access rules associated with the secured document. In one embodiment, the access rules are provided within the security information portion of the secured document. The access rules are then evaluated 504 against the access privilege of the user attempting to access the secured document. A decision 506 then determines whether the access rules are satisfied. When the decision 506 determines that the access rules are not satisfied, then access to the secured document is denied. Alternatively, when the decision 506 determines that the access rules are satisfied, then a file key associated with the secured document is obtained 510. In one embodiment, the file key is provided within the security information portion of the secured document. The file key can be encrypted or in a clear format. In the case in which the file key is itself encrypted, the file key is first decrypted. Next, the secured document is decrypted 512 using the file key. Following the operation 512, the access control processing 500 is complete and ends.

Figure 6:
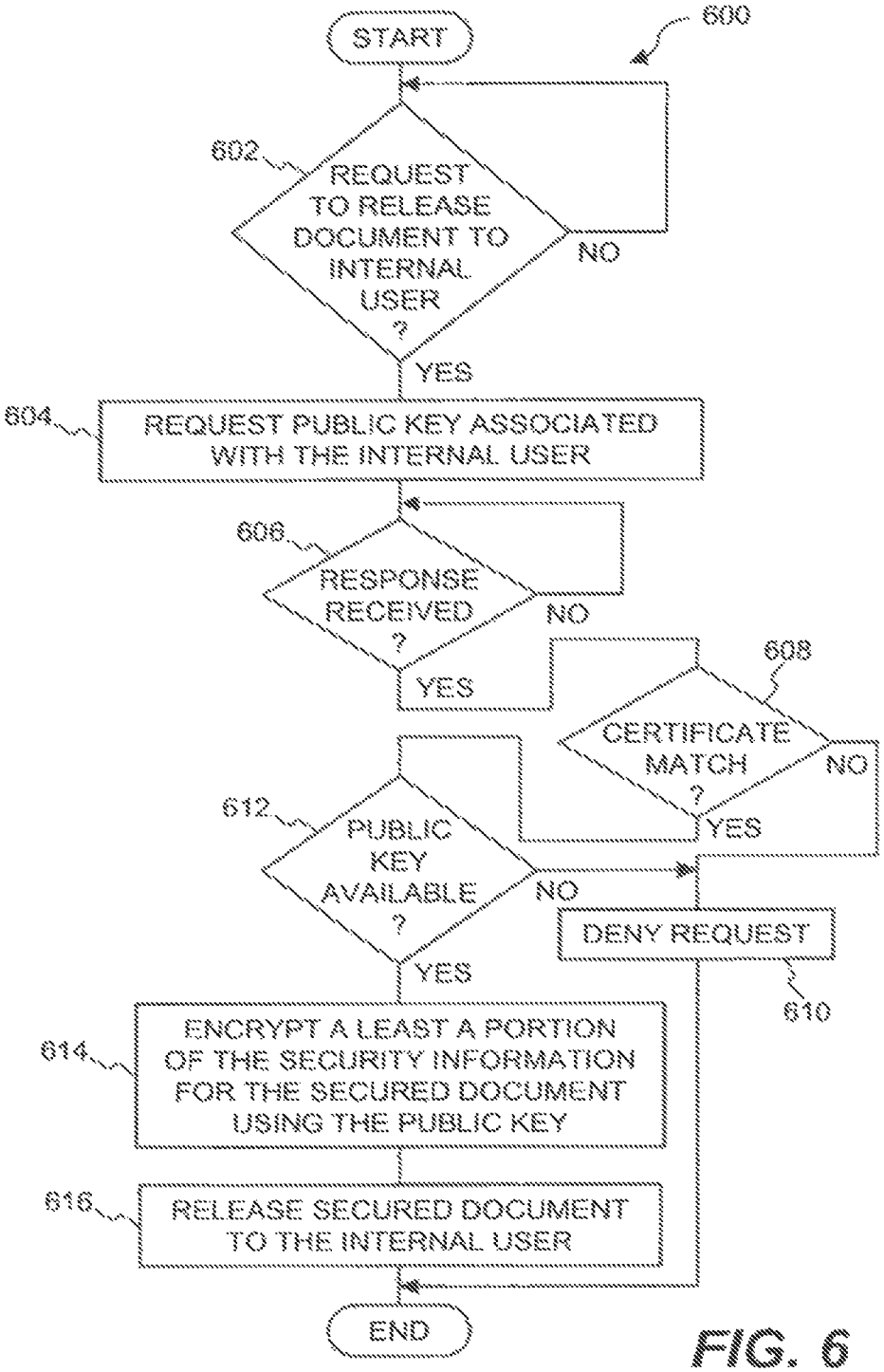
FIG. 6 is a flow diagram of client-side document delivery processing according to one embodiment of the invention.
Figure 7:
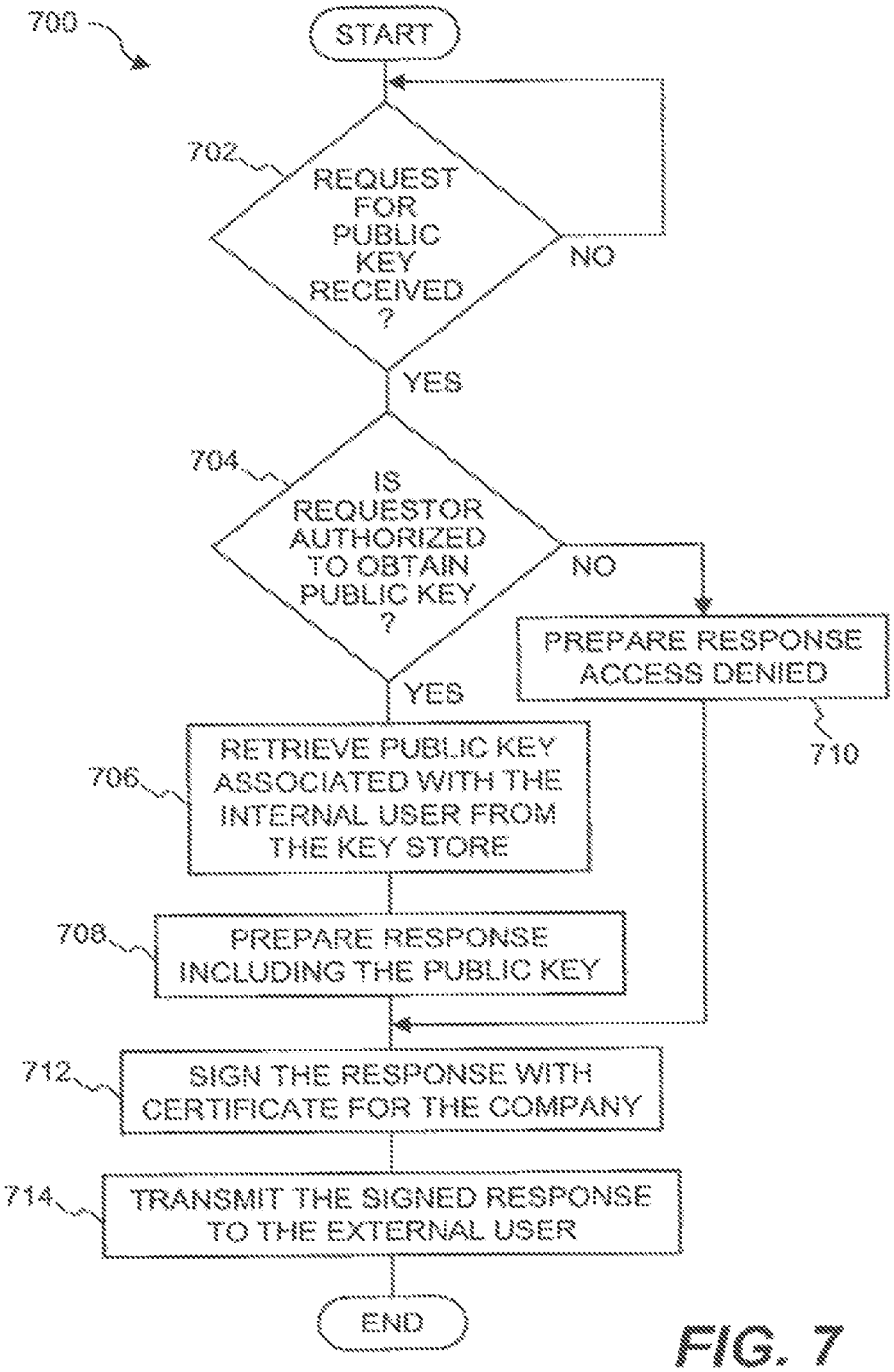
FIG. 7 is a flow diagram of server-side document delivery processing according to one embodiment of the invention.

FIGS. 6 and 7 pertain to document delivery processing in which an external user provides a secured document to an internal user. FIG. 6 is a flow diagram of client-side document delivery processing 600 according to one embodiment of the invention. The client-side document delivery processing 600 is referred to as client-side because a client machine associated with the external user is performing or initiating the operations.

The client-side document delivery processing 600 begins with a decision 602 that determines whether a request (from an external user) to release a document to an internal user has been received. When the decision 602 determines that a request to release a document to an internal user has not yet been received, the client-side document delivery processing 600 awaits such a request. Once the decision 602 determines that a request to release a document to an internal user has been received, the client-side document delivery processing 600 continues. In other words, the client-side document delivery processing 600 can be considered to be invoked when the decision 602 determines that a request to release a document to an internal user has been received. The external user can interact with the client machine to initiate or make such a request.

After the decision 602 determines that a request to release a document to an internal user has been received, a public key associated with the internal user is requested 604. Here, according to one embodiment, the public key associated with the internal user is requested 604 from the document security system. A decision 606 then determines whether a response has been received. When the decision 606 determines that a response has not yet been received, the client-side document delivery processing 600 awaits such a response. When the decision 606 determines that a response has been received, a decision 608 first determines whether the request is from an external user who is what they claim to be. According to one embodiment, certificates are used prevent someone from impersonating someone else. Depending on implementation, a certification of the external user may be issued by a third party (e.g., Certificate Authority) or the document security system itself. When the decision 608 determines that the external user is not who they claim to be, then the request is denied 610 because the response received was presumably from an unauthorized user or system.

On the other hand, when the decision 608 determines that the external user is who they claim to be (i.e., an authorized user), a decision 612 determines whether a public key is available. Here, the response received is examined to determine whether the response includes the public key associated with the internal user. Hence, when the public key is available, it is provided with the response being received. In one embodiment, the availability of the public key is controlled by the partner relationship.

When the decision 612 determines that the public key is not available, then the request is denied 610 because the client machine does not have access to the public key associated with the internal user. On the other hand, when the decision 612 determines that the public key is available, then at least a portion of the security information for the secured document is encrypted 614 using the public key. In one embodiment, a file key within the security information for the secured document is encrypted using the public key. Thereafter, the secured document is released 616 to the internal user. In one embodiment, the secured document is released 616 by being transmitted. Following the operations 610 or 616, the client-side document delivery processing 600 is complete and ends.

FIG. 7 is a flow diagram of server-side document delivery processing 700 according to one embodiment of the invention. The server-side document delivery processing 700 is, for example, performed by the document security system, such as the document security system 100 illustrated in FIG. 1. The server-side document delivery processing 700 is responsive to a public key request from the client-side document delivery processing 600.

The server-side document delivery processing 700 begins with a decision 702 that determines whether a request for a public key from an external user has been received. In one embodiment, the request is provided by the operation 604 of the client-side document delivery processing 600 illustrated in FIG. 6. When the decision 702 determines that a request for a public key has not yet been received, then the server-side document delivery processing 700 awaits such a request. When the decision 702 determines that a request for a public key has been received, then a decision 704 determines whether the external user (requestor) is authorized to obtain the public key. Here, the authorization can be determined based on whether a partner relationship has been previously established between the external user and an organization. When the decision 704 determines that the external user is not authorized to receive the public key, then a response is prepared 710 indicating that access has been denied.

On the other hand, when the decision 704 determines that the external user is authorized to obtain the public key, then the public key associated with the internal user is retrieved 706 from a key store. The key store can, for example, be implemented as a database provided within the document security system. After the public key associated with the internal user has been retrieved 706, a response including the public key can be prepared 708. After the response has been prepared in operations 708 or 710, the response is signed 712 with a certificate for the organization. In one embodiment, the certificate would have been previously embedded a priori in the machine (e.g., client machine) of the external user. The signed response is then transmitted 714 to the external user. Typically, the transmission of the signed response is sent to the external user over a secured channel through a network (data network, e.g., the Internet). Following the operation 714, the server-side document delivery processing 700 is complete and ends.

Figure 8:
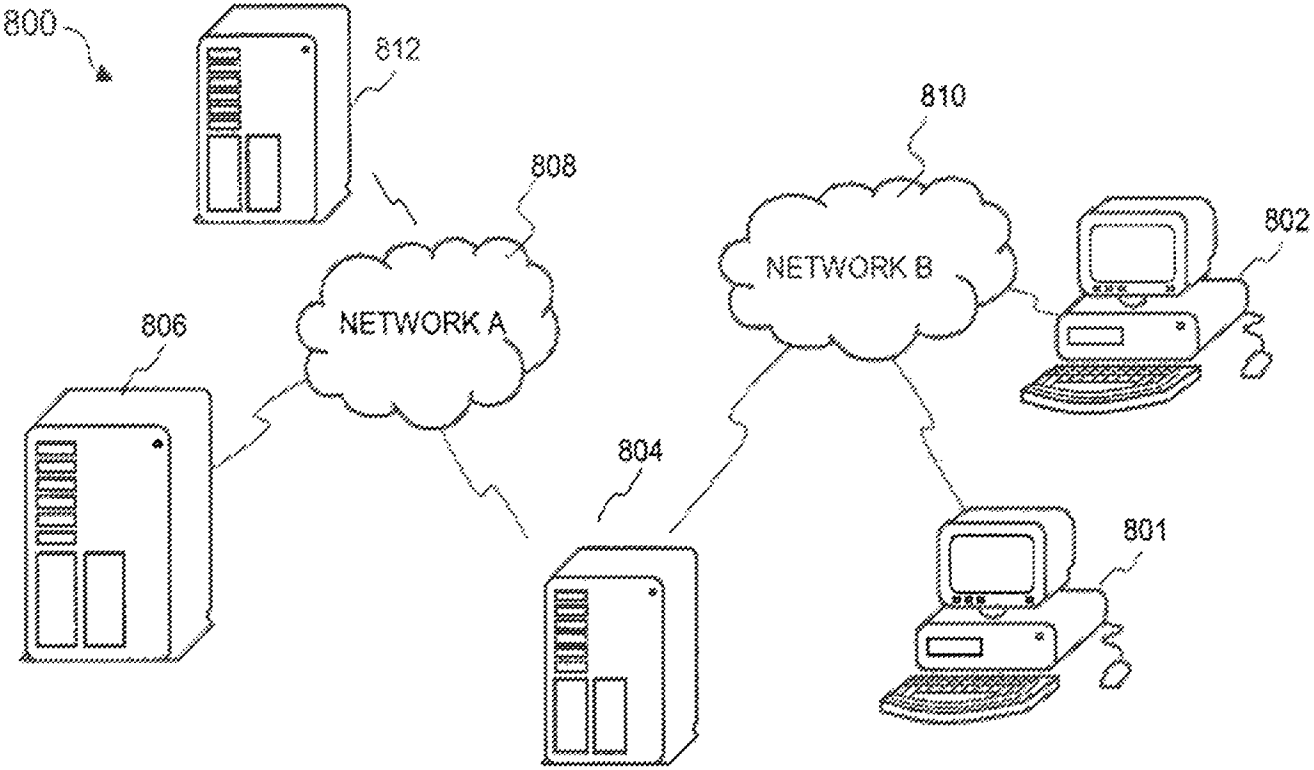
FIG. 8 shows a basic security system in which the invention may be practiced in accordance with one embodiment thereof.

FIG. 8 shows a basic security system 800 in which the invention may be practiced in accordance with one embodiment thereof. The security system 800 may be employed in an enterprise or inter-enterprise environment. It includes a first server 808 (also referred to as a central server) providing centralized access management for the enterprise. The first server 808 can control restrictive access to files secured by the security system 800. To provide dependability, reliability and scalability of the system, one or more second servers 804 (also referred to as local servers, of which one is shown) may be employed to provide backup or distributed access management for users or client machines serviced locally. For illustration purposes, there are two client machines 801 and 802 being serviced by a local server 804. Alternatively, one of the client machines 801 and 802 may be considered as a networked storage device.

Secured files may be stored in either one of the devices 801, 802, 804, 806 and 812. When a user of the client machine 801 attempts to exchange a secured file with a remote destination 812 being used by an external user, one or more of the processing 200, 300, 400, 500, 600 and 700 discussed above are activated to ensure that the requested secured file is delivered without compromising the security imposed on the secured file.

Figure 9:
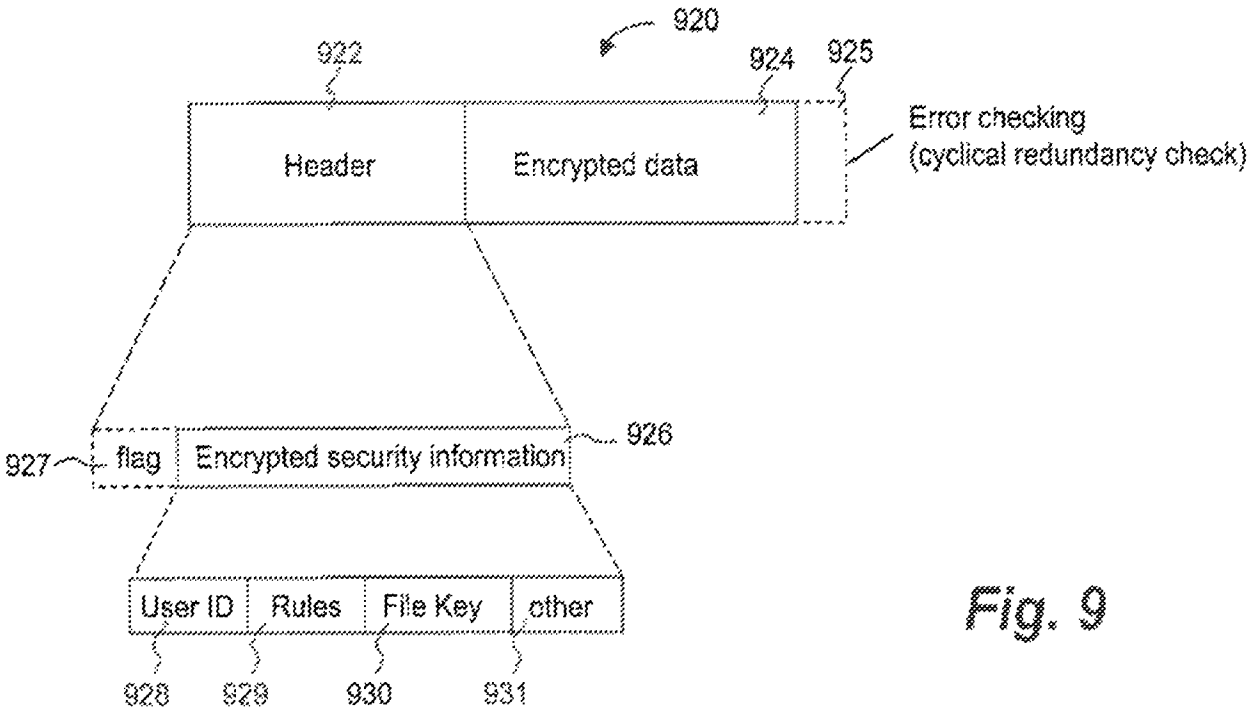
FIG. 9 shows an exemplary data structure of a secured file that may be used in one embodiment of the invention.

FIG. 9 shows an exemplary data structure 920 of a secured file that may be used in one embodiment of the invention. The data structure 920 includes two portions: a header (or header portion) 922 and encrypted data (or an encrypted data portion) 924. The header 922 can be generated in accordance with a security template associated with the store and thus provides restrictive access to the data portion 924 which is an encrypted version of a plain file. Optionally, the data structure 920 may also include an error-checking portion 925 that stores one or more error-checking codes, for example, a separate error-checking code for each block of encrypted data 924. These error-checking codes may also be associated with a Cyclical Redundancy Check (CRC) for the header 922 and/or the encrypted data 924. The header 922 includes a flag bit or signature 927 and security information 926 that is in accordance with the security template for the store. According to one embodiment, the security information 926 is encrypted and can be decrypted with a user key associated with an authenticated user (or requestor).

The security information 926 can vary depending upon implementation. However, as shown in FIG. 9, the security information 926 includes a user identifier (ID) 928, access policy (access rules) 929, a file key 930 and other information 931. Although multiple user identifiers may be used, a user identifier 928 is used to identify a user or a group that is permitted to access the secured file. The access rules 929 provide restrictive access to the encrypted data portion 924. The file key 930 is a cipher key that, once obtained, can be used to decrypt the encrypted data portion 924 and thus, in general, is protected. In one implementation of the data structure 920, the file key 930 is encrypted in conjunction with the access rules 929. In another implementation of the data structure 920, the file key 930 is double encrypted with a protection key and further protected by the access rules 929. The other information 931 is an additional space for other information to be stored within the security information 926. For example, the other information 931 may be used to include other information facilitating secure access to the secured file, such as version number or author identifier.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that file security systems are able to protect secured files (e.g., documents) even when external users are provided limited access to secured files. Another advantage of the invention is that a file security system can permit external users to access certain secured files (e.g., secured documents) without compromising integrity of the file security system. For example, external users having working relationships with internal users are able to be given limited user privileges within the file security system such that restricted file (document) exchange is permitted between such internal and external users. Still another advantage of the invention is that that amount of specialized software required at machines utilized by external users is minimal.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A system comprising:

a server *comprising* an access manager configured to*:* restrict access to a file of an organization having an internal user responsive to a request for the file, the file comprising a header portion including an access rule that restricts access to the file[,] and a content portion encrypted by a file key; *and*

*determine whether a partner relationship exists between the organization and an external partner;* a database coupled to the server and configured to store an encryption key for use between the internal user and [an] *the* external partner comprising an external user, wherein the access manager is further configured to encrypt the file key, located within security information of the header portion of the file, with the encryption key in response to [a] *determining that the* partner relationship [existing] *exists* between the organization and the external partner and deny the request in response to *determining that* the partner relationship *does* not [existing] *exist*; and an external access server operatively connected to the server and coupled between the server and a data network, the data network configured to allow the external user use of the external access server, wherein the external access server is configured to permit file exchange between the internal user and the external user via the server.

2. The system of claim 1, wherein file exchange [by] *between* the internal and external users is permitted in response to the internal and external users being members of a common group.

3. The system of claim 1, wherein the encryption key comprises a public-private key pair, and wherein the access manager is configured to encrypt the security information with the public key.

4. The system of claim 1, wherein the server further comprises:

a central server; and a local server operatively connected to the central server.

5. The system of claim 1, wherein the data network includes at least a part of an Internet.

6. The system of claim 1, wherein the external user is unaffiliated with the *organization comprising the* internal user.

7. The system of claim 1, wherein:

the external user and the internal user are members of a common group; and the external user is unable to change group membership and is unable to query group membership to determine members of the common group.

8. A method comprising:

maintaining, in a database, an encryption key for use between an organization comprising an internal user and an external partner comprising an external user;

receiving, by a server coupled to the database, a request to access a file, the file comprising a header portion including an access rule that restricts access to the filer and a content portion encrypted by a file key;

*determining whether a partner relationship exists between the organization and the external partner;* encrypting the file key, located within security information of the header portion, with the encryption key in response to [a] *determining that the* partner relationship [existing] *exists* between the organization and the external partner; and denying the request in response to *determining that* the partner relationship *does* not [existing] *exist*.

9. The method of claim 8, further comprising permitting file exchange between the internal user and the external user through an external access server in response to the internal user and the external user being members of a common group.

10. The method of claim 8, further comprising using a public-private key pair as the encryption key.

11. The method of claim 10, further comprising:

encrypting the [security information] *file key* with the public key.

12. The method of claim 8, further comprising:

communicating, in response to the [security information] *file key* being encrypted, the requested file via a data network.

13. The method of claim 8, wherein the external user is unaffiliated with the organization comprising the internal user.

14. The method of claim 13, further comprising:

blocking the external user from changing group membership and querying group membership to determine members of a common group, the common group comprising the internal user and the external user.

15. A computer-readable storage device having instructions stored thereon, execution of which, by a computing device associated with an organization, causes the computing device to perform operations comprising:

maintaining an encryption key for use between the organization comprising an internal user and an external partner comprising an external user;

receiving a request to access a file at the computing device, the file comprising a header portion including an access rule that restricts access to the file and a content portion encrypted by a file key;

*determining whether a partner relationship exists between the organization and the external partner;* encrypting the file key, located within security information of the header portion, with the encryption key in response to [a] *determining that the* partner relationship [existing] *exists* between the organization and the external partner; and denying the request in response to *determining that* the partner relationship *does* not [existing] *exist*.

16. The computer-readable storage device of claim 15, the operations further comprising permitting file exchange between the internal user and the external user through an external access server in response to the internal user and the external user being members of a common group.

17. The computer-readable storage device of claim 15, further comprising using a public-private key pair as the encryption key.

18. The computer-readable storage device of claim 17, the operations further comprising:

encrypting the [security information] *file key* with the public key.

19. The computer-readable storage device of claim 15, the operations further comprising:

communicating, in response to the [security information] *file key* being encrypted, the requested file via a data network.

20. The computer-readable storage device of claim 15, wherein the external user is unaffiliated with the organization comprising the internal user.

*21. A system comprising:*

*a server comprising an access manager configured to restrict access to a file of an organization responsive to a request for the file, the file comprising a header portion including an access rule that restricts access to the file, and a content portion encrypted by a file key;*

*a database coupled to the server and configured to store an encryption key associated with an external user, wherein the access manager is further configured to encrypt the file key, located within security information of the header portion of the file, with the encryption key in response to determining that the encryption key associated with the external user is available and deny the request in response to the encryption key not existing; and*

*an external access server operatively connected to the server and coupled between the server and a data network, the data network configured to allow the external user use of the external access server, wherein the external access server is configured to transmit the file to the external user via the data network.*

*22. The system of claim 21, wherein the encryption key comprises a public-private key pair, and wherein the access manager is configured to encrypt the security information with the public key.*

*23. The system of claim 21, wherein the server further comprises:*

*a central server; and*

*a local server operatively connected to the central server.*

*24. The system of claim 21, wherein the data network includes at least a part of an Internet.*

*25. The system of claim 21, wherein the external user is unaffiliated with the organization.*

*26. The system of claim 21, wherein the external user is in a partner relationship with an internal user of the organization.*

*27. The system of claim 21, wherein the access manager is further configured to:*

*decrypt the header portion of the file using the encryption key associated with the external user; and*

*evaluate the access rule against an access privilege of the external user to determine whether to permit access to the file.*

* * * * *